(12) United States Patent
Watanabe et al.

(10) Patent No.: US 11,106,110 B2
(45) Date of Patent: Aug. 31, 2021

(54) OPTICAL SHAPING APPARATUS AND METHOD OF MANUFACTURING SHAPED OBJECT

(71) Applicant: Sony Corporation, Tokyo (JP)

(72) Inventors: Tomomasa Watanabe, Kanagawa (JP); Masayuki Tanaka, Kanagawa (JP); Hisayoshi Motobayashi, Kanagawa (JP); Shiro Uchida, Tokyo (JP)

(73) Assignee: Sony Corporation, Tokyo (JP)

( * ) Notice: Subject to any disclaimer, the term of this patent is extended or adjusted under 35 U.S.C. 154(b) by 472 days.

(21) Appl. No.: 15/518,932

(22) PCT Filed: Sep. 17, 2015

(86) PCT No.: PCT/JP2015/076519
§ 371 (c)(1),
(2) Date: Apr. 13, 2017

(87) PCT Pub. No.: WO2016/063665
PCT Pub. Date: Apr. 28, 2016

(65) Prior Publication Data
US 2017/0232669 A1    Aug. 17, 2017

(30) Foreign Application Priority Data
Oct. 20, 2014    (JP) .............................. JP2014-213380

(51) Int. Cl.
*B29C 64/00* (2017.01)
*G02F 1/31* (2006.01)
(Continued)

(52) U.S. Cl.
CPC .............. *G02F 1/31* (2013.01); *A45D 29/00* (2013.01); *B29C 64/135* (2017.08); *B29C 67/00* (2013.01);
(Continued)

(58) Field of Classification Search
CPC ..... G02F 1/31; G02F 2001/291; B33Y 10/00; B33Y 30/00; G02B 26/10; B29C 67/00;
(Continued)

(56) References Cited

U.S. PATENT DOCUMENTS

2009/0142436 A1 * 6/2009 Kuzusako .............. B33Y 30/00
                                                                   425/174.4
2009/0175977 A1 * 7/2009 Kuzusako ............. B29C 64/106
                                                                   425/174.4
(Continued)

FOREIGN PATENT DOCUMENTS

JP    56-144478 A    11/1981
JP    02-307730 A    12/1990
(Continued)

OTHER PUBLICATIONS

International Search Report and Written Opinion and English translation thereof dated Dec. 8, 2015 in connection with International Application No. PCT/JP2015/076519.
(Continued)

*Primary Examiner* — Nahida Sultana
(74) *Attorney, Agent, or Firm* — Wolf, Greenfield & Sacks, P.C.

(57) ABSTRACT

An optical shaping apparatus includes: a light source unit that outputs collimated light; an optical function unit that is disposed on an optical path of the collimated light and modulates the optical path or a phase of the collimated light; and a control unit that controls operation of the optical function unit, to irradiate a target surface with modulated light produced in the optical function unit.

17 Claims, 22 Drawing Sheets

(51) Int. Cl.
   *G02B 26/10* (2006.01)
   *B33Y 30/00* (2015.01)
   *B29C 67/00* (2017.01)
   *A45D 29/00* (2006.01)
   *B29C 64/135* (2017.01)
   *B33Y 10/00* (2015.01)
   *G02F 1/29* (2006.01)

(52) U.S. Cl.
   CPC .............. *B33Y 10/00* (2014.12); *B33Y 30/00* (2014.12); *G02B 26/10* (2013.01); *A45D 2029/005* (2013.01); *G02F 1/291* (2021.01); *G05B 2219/49013* (2013.01)

(58) Field of Classification Search
   CPC ........ B29C 64/135; G05B 2219/49013; A45D 2029/005; A45D 29/00
   See application file for complete search history.

(56) References Cited

U.S. PATENT DOCUMENTS

| | | | | |
|---|---|---|---|---|
| 2009/0184444 A1* | 7/2009 | Honda | ................... | B33Y 30/00 264/401 |
| 2013/0057890 A1* | 3/2013 | Kudo | ................ | G06K 15/1219 358/1.13 |
| 2013/0100509 A1* | 4/2013 | Igarashi | ................. | G02B 26/10 358/510 |
| 2014/0063444 A1 | 3/2014 | Wildsmith et al. | | |
| 2014/0319219 A1* | 10/2014 | Liu | .................... | G06K 7/10792 235/455 |
| 2015/0055144 A1* | 2/2015 | Fleming | ............. | G01B 11/2433 356/625 |
| 2015/0211928 A1* | 7/2015 | Itoh | ........................... | G01J 3/42 356/369 |
| 2019/0113741 A1* | 4/2019 | Kito | ...................... | G02B 26/10 |

FOREIGN PATENT DOCUMENTS

| | | |
|---|---|---|
| JP | 03-039234 A | 2/1991 |
| JP | 2002-210835 A | 7/2002 |
| JP | 2003-340923 A | 12/2003 |
| JP | 2006-150751 A | 6/2006 |
| JP | 2009-113294 A | 5/2009 |
| JP | 2012-232041 A | 11/2012 |
| JP | 2013-214068 A | 10/2013 |

OTHER PUBLICATIONS

International Preliminary Report on Patentability and English translation thereof dated May 4, 2017 in connection with International Application No. PCT/JP2015/076519.

* cited by examiner

[FIG. 1]
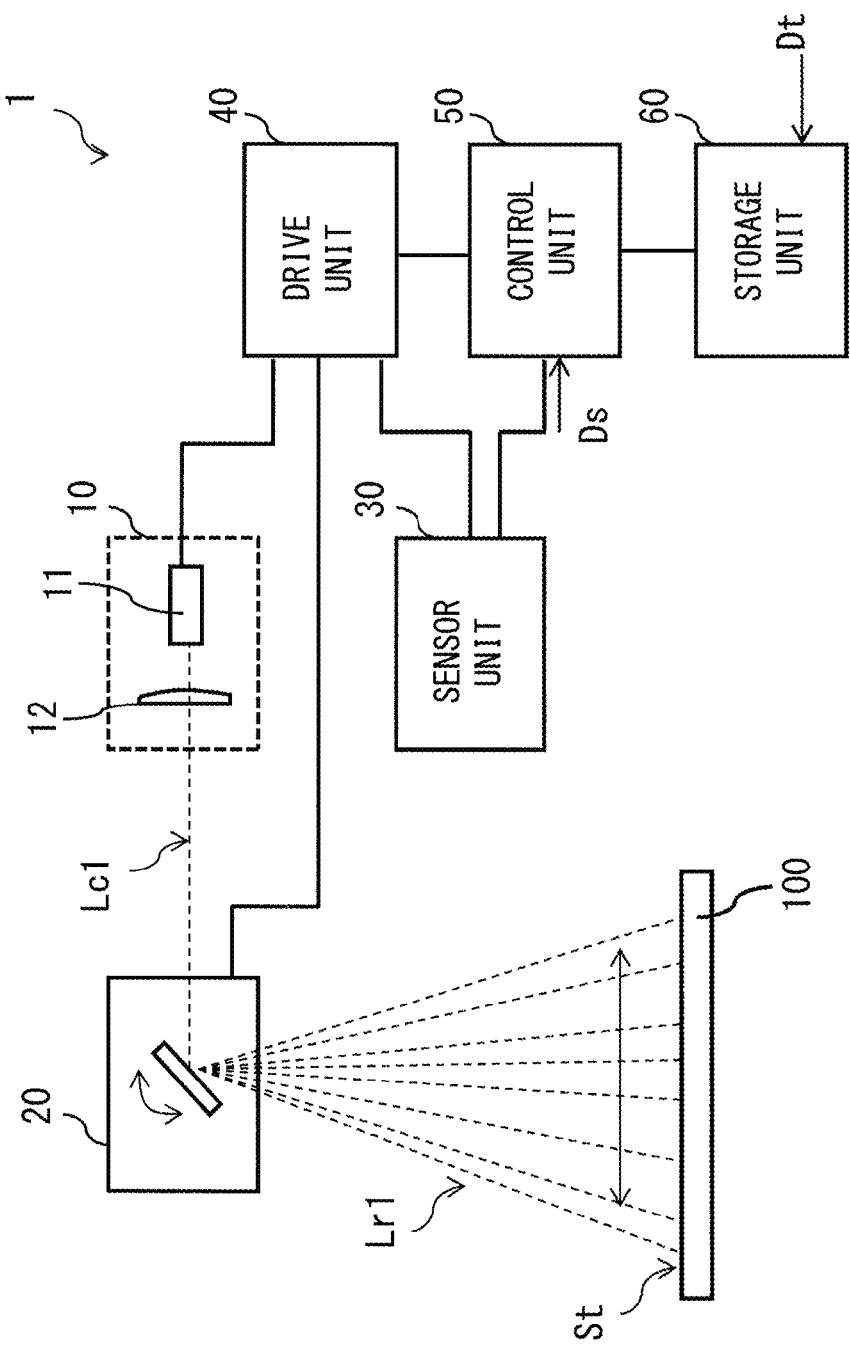

[ FIG. 2A ]
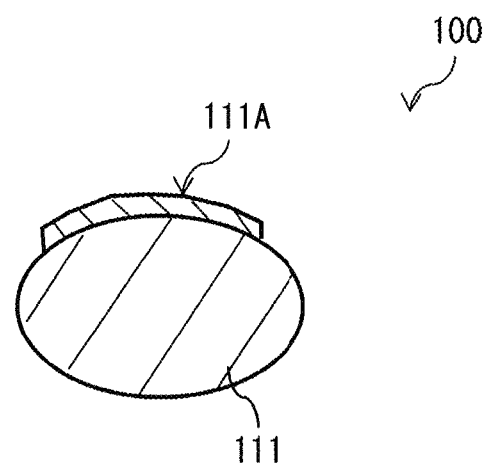

[FIG. 2B]
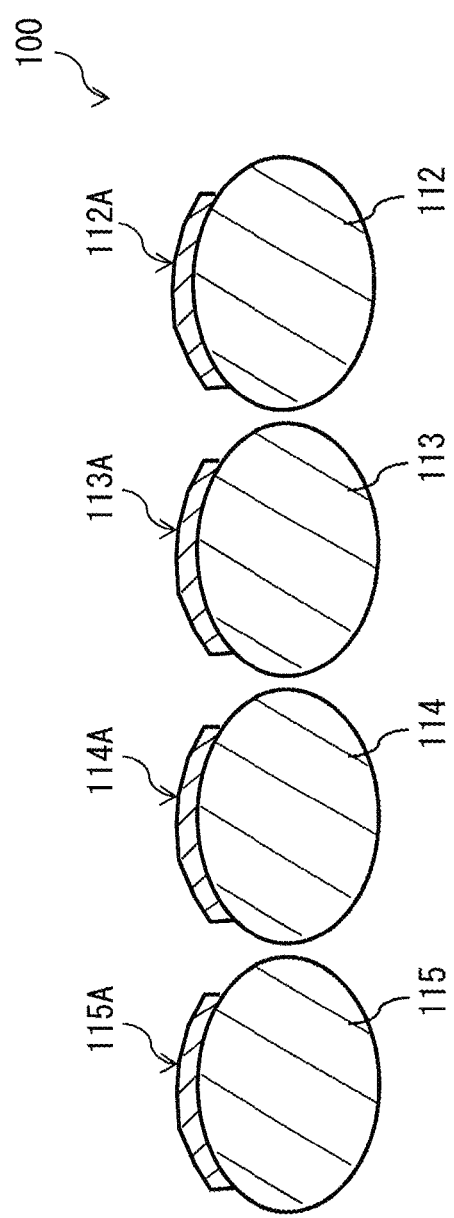

[ FIG. 3A ]
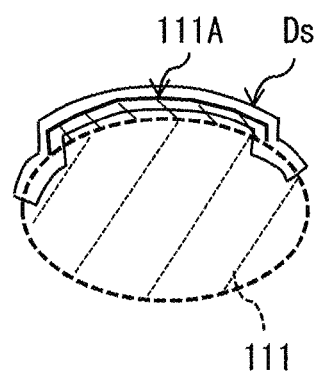
[ FIG. 3B ]
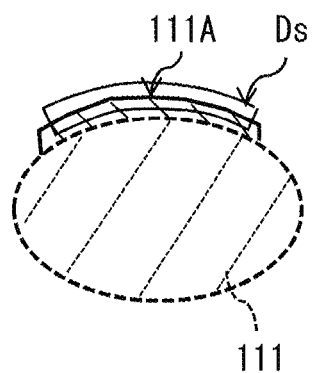

[FIG. 4]
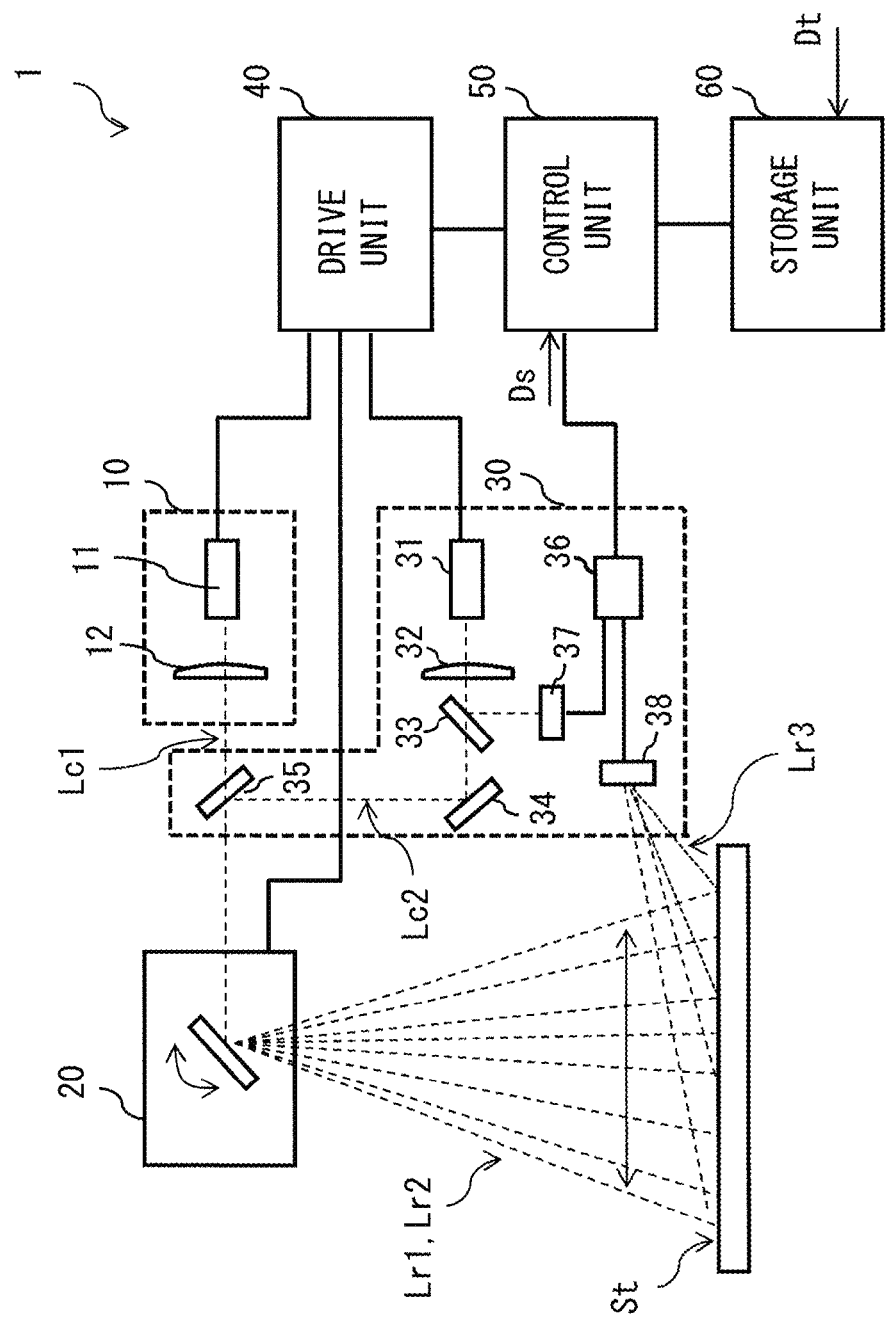

[ FIG. 5A ]
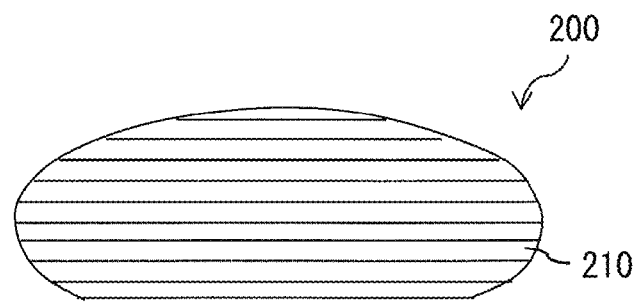
[ FIG. 5B ]
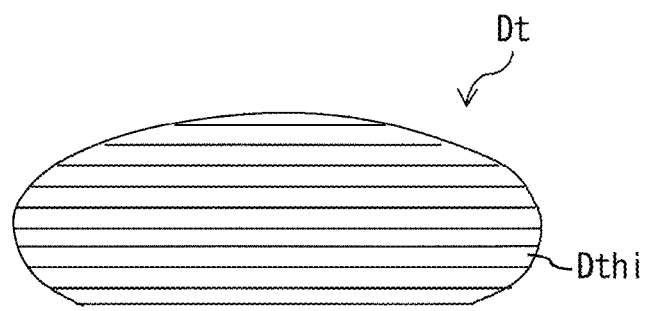

[ FIG. 6A ]
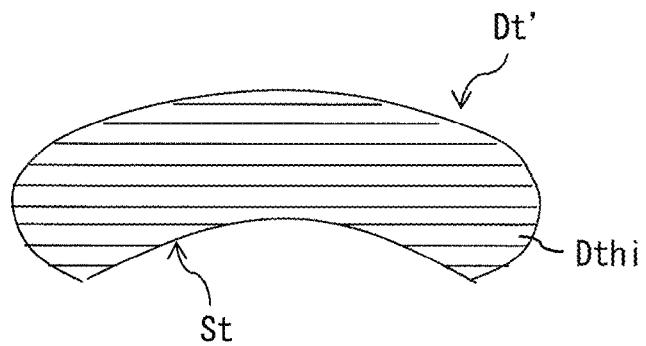
[ FIG. 6B ]
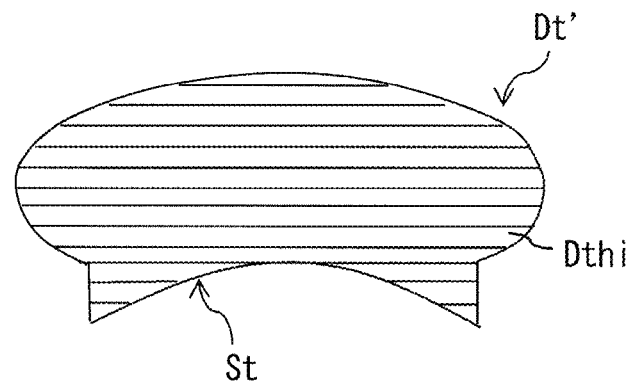
[ FIG. 6C ]
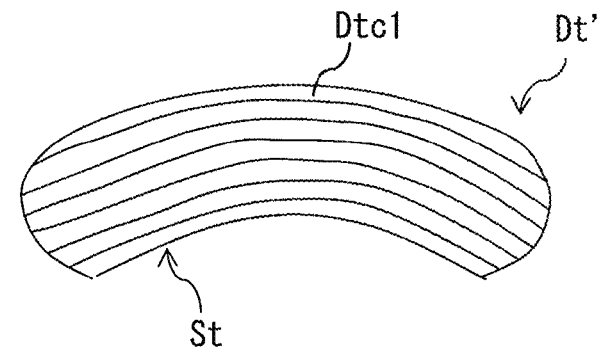

[ FIG. 7 ]
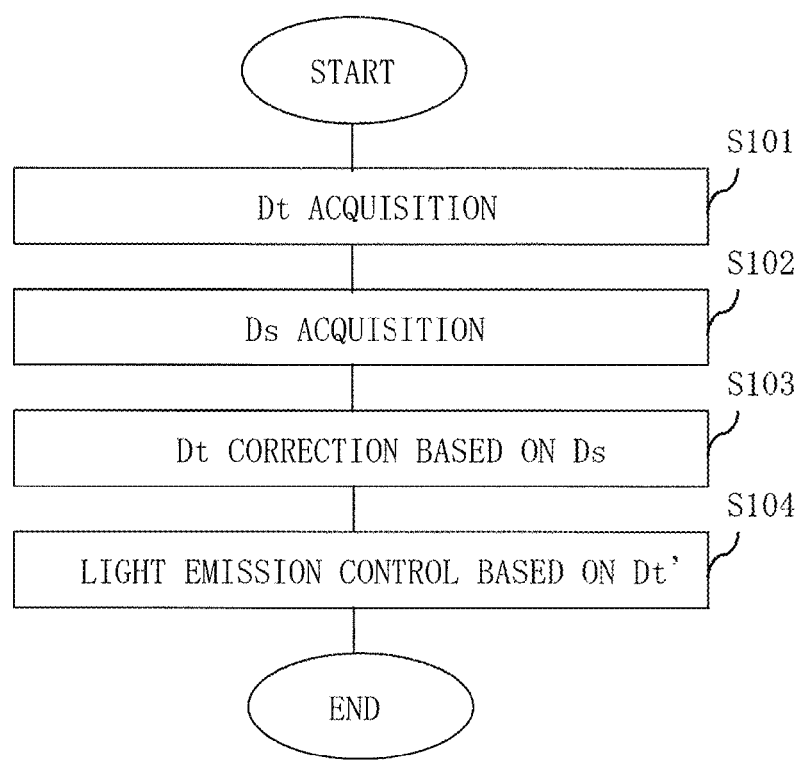

[ FIG. 8A ]
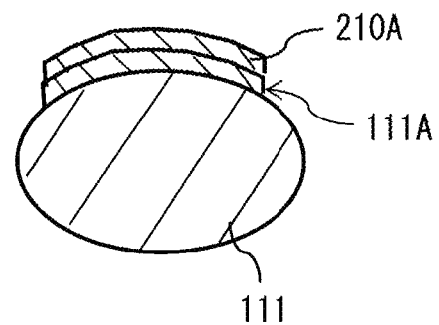
[ FIG. 8B ]
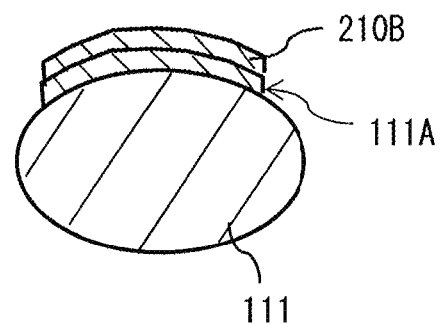

[ FIG. 8C ]
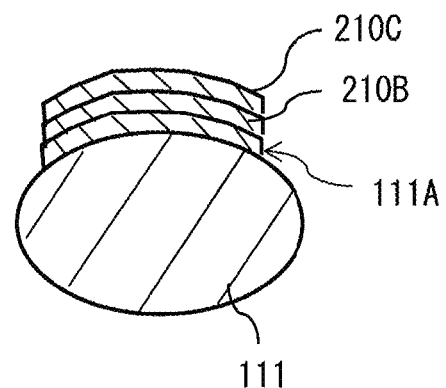
[ FIG. 8D ]
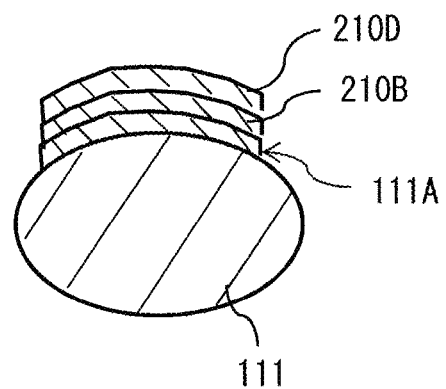

[FIG. 9]
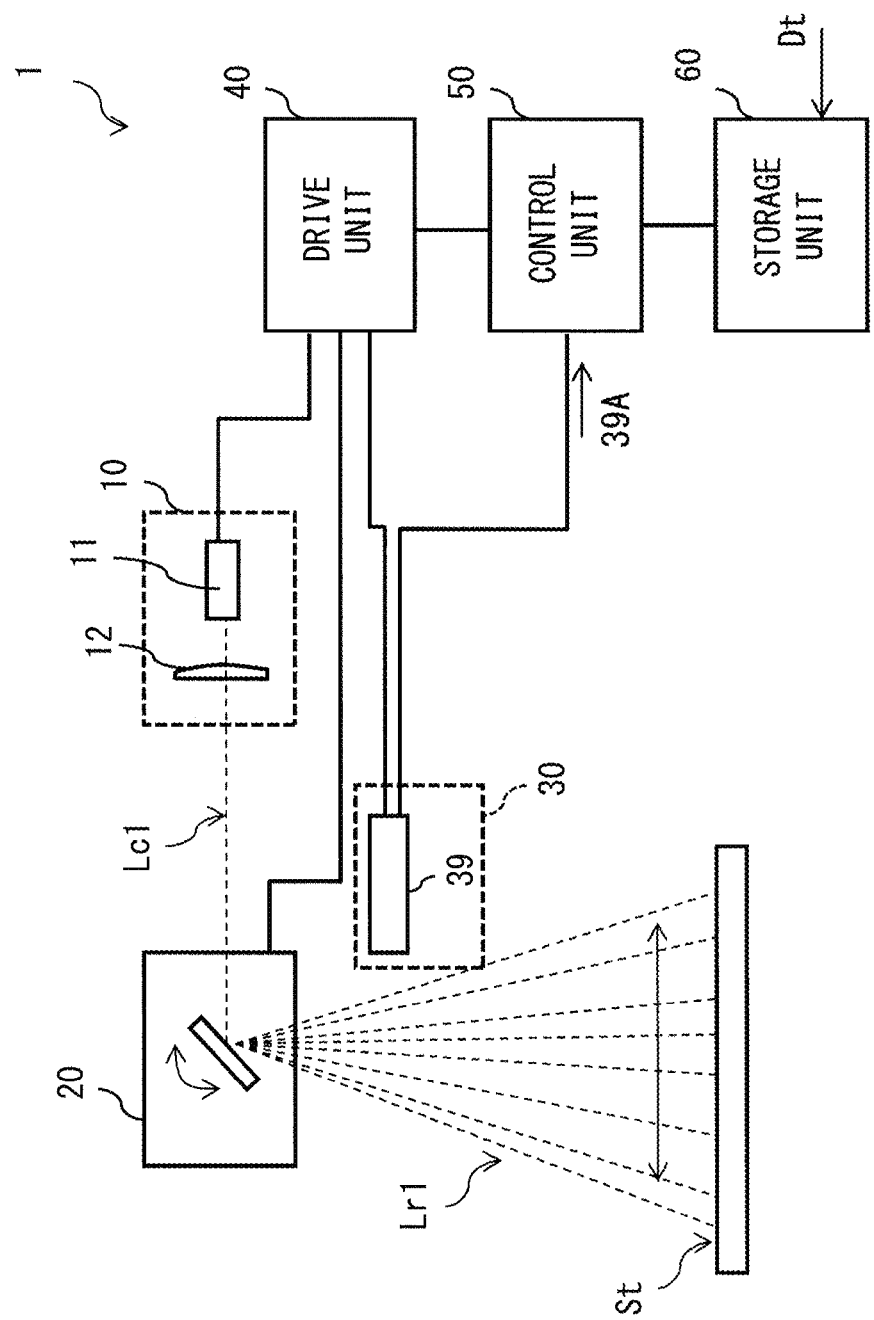

[ FIG. 10A ]
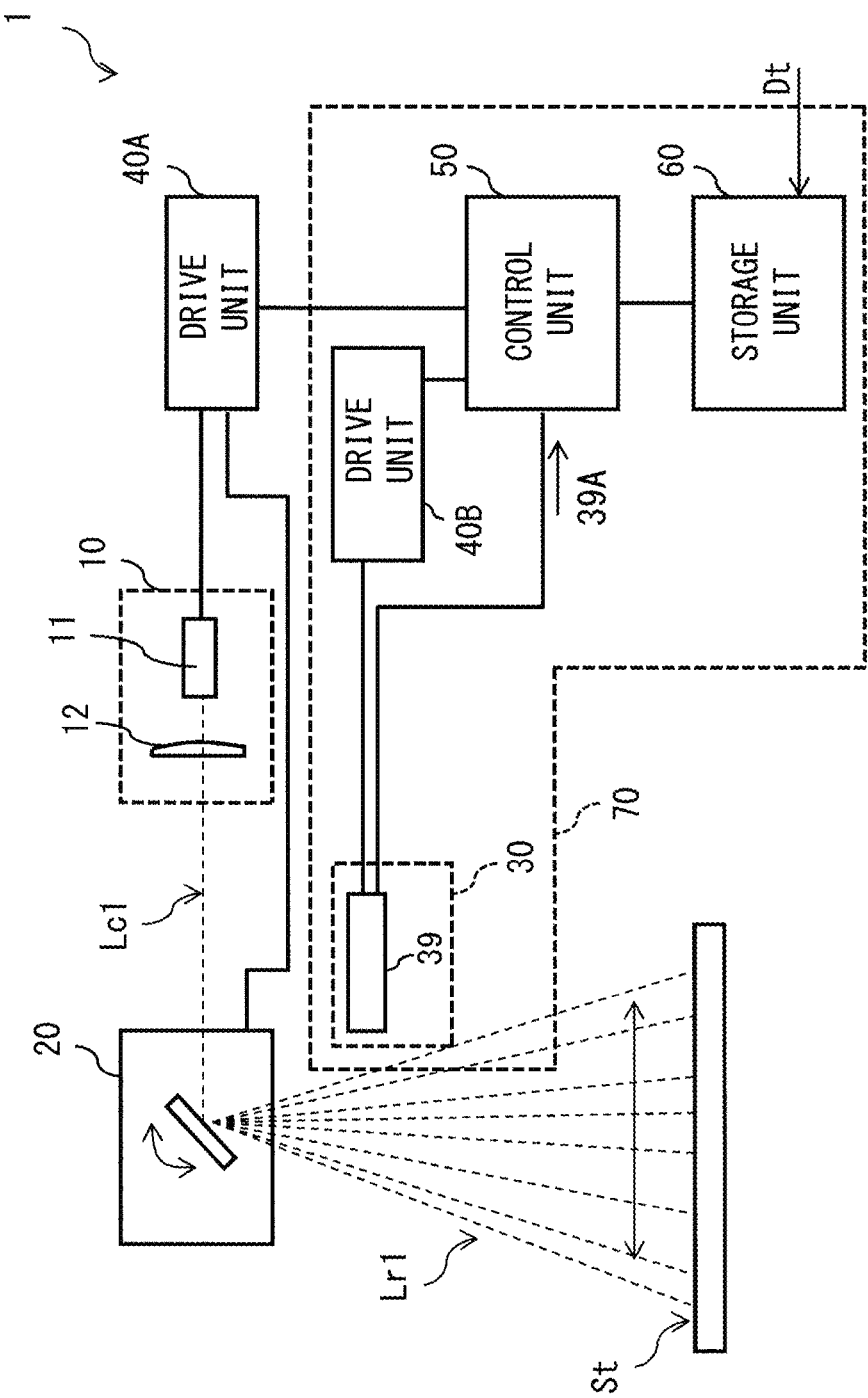

[FIG. 10B]
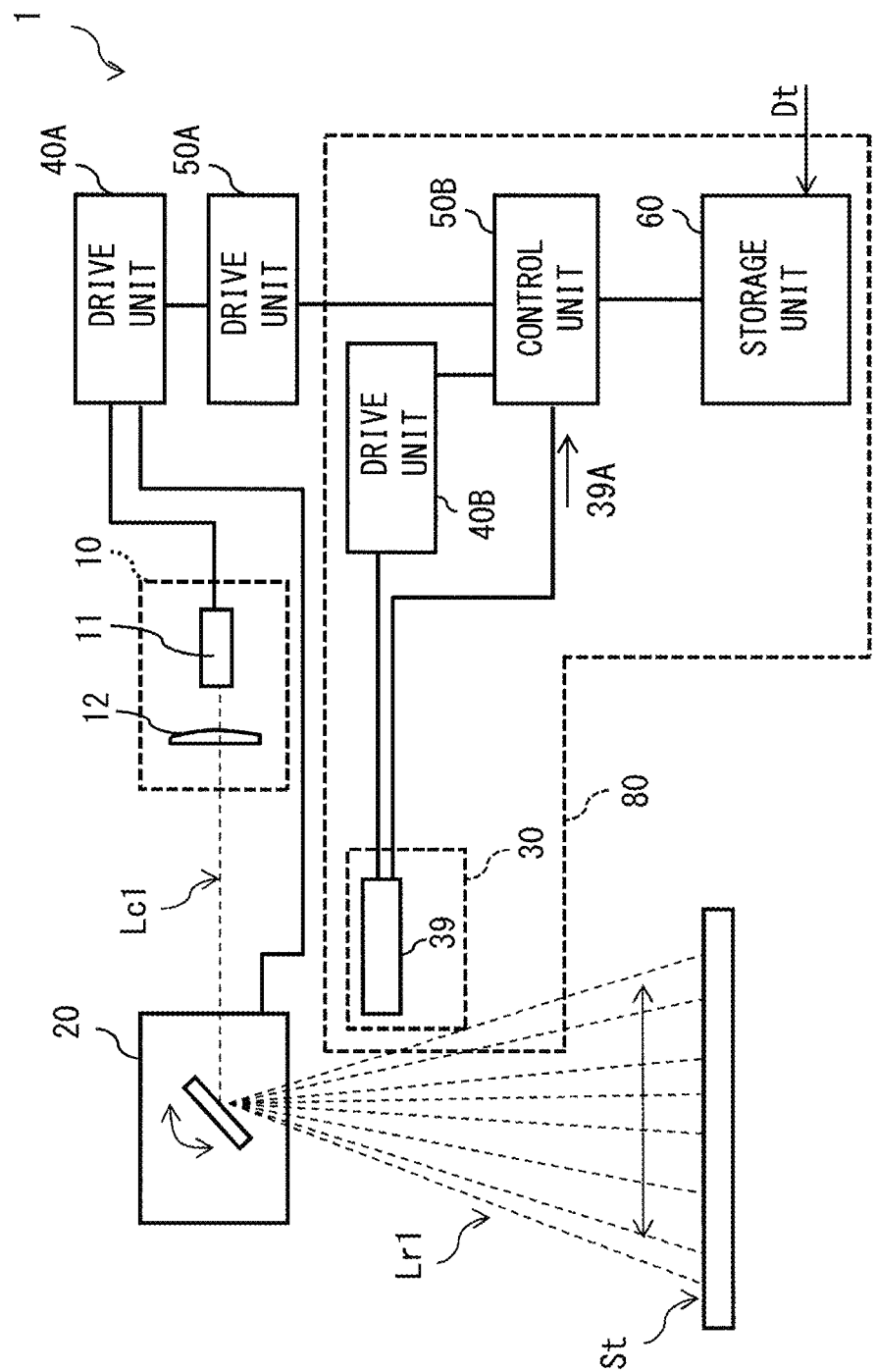

[ FIG. 10C ]
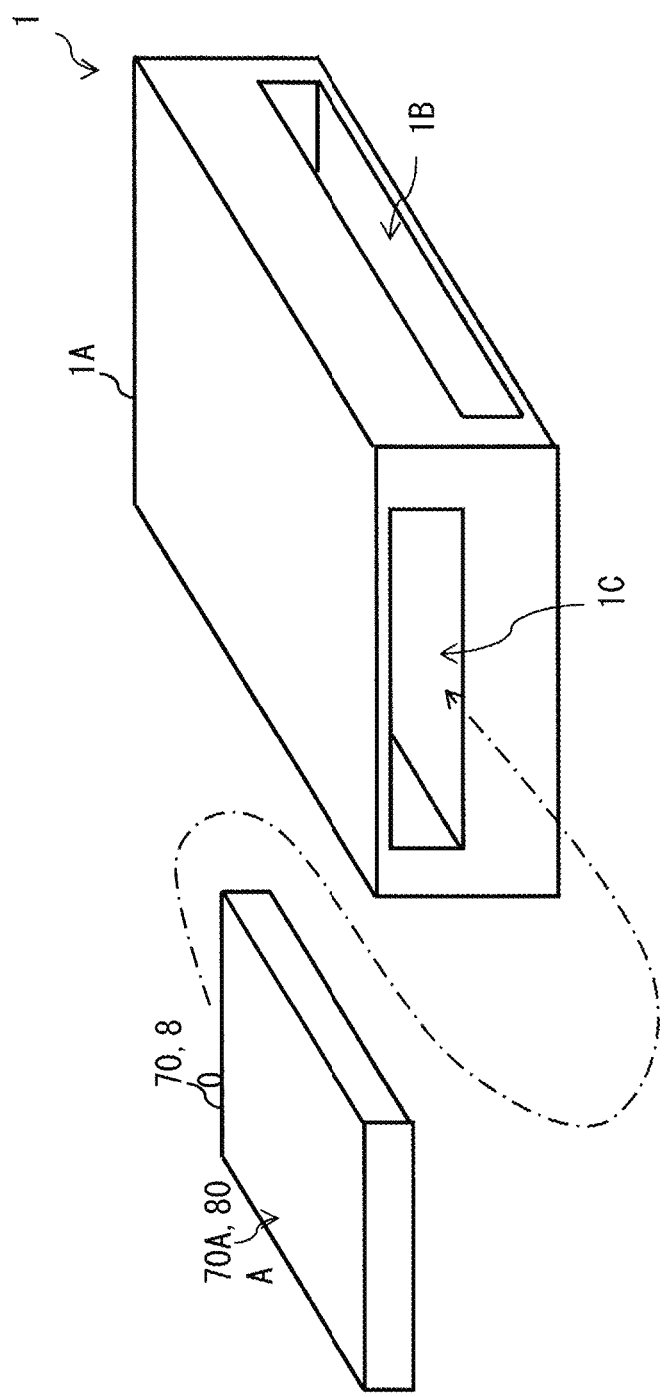

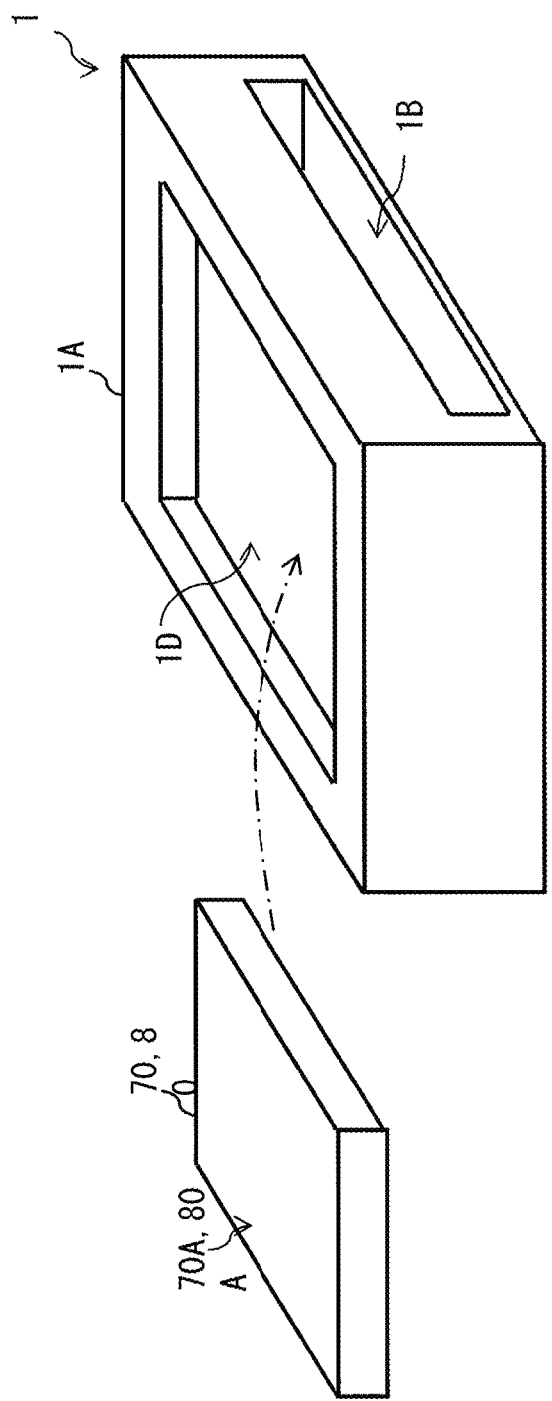
[ FIG. 10D ]

[ FIG. 11 ]
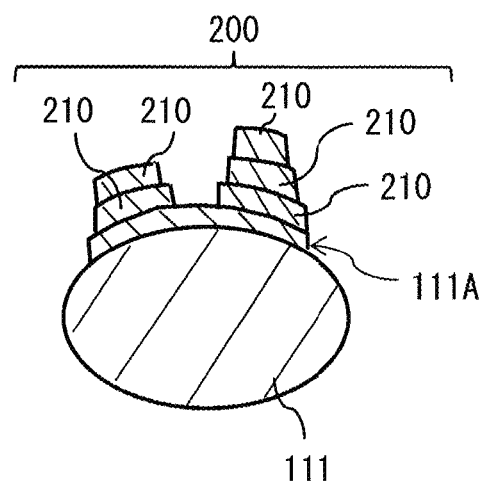

[ FIG. 12 ]
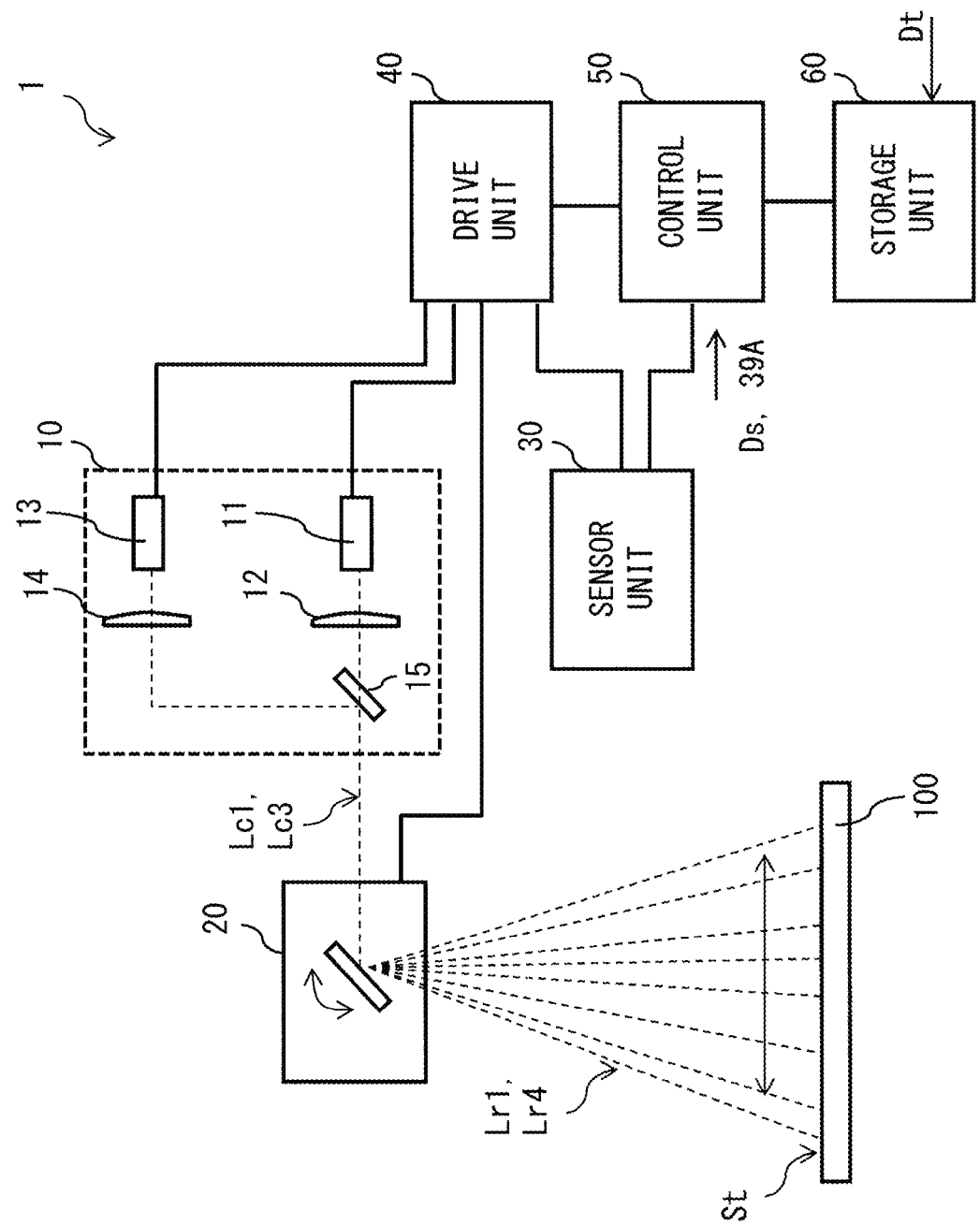

[ FIG. 13 ]
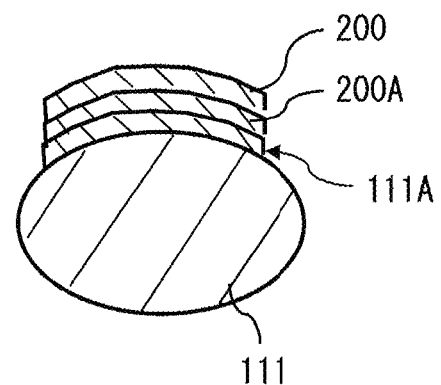

[FIG. 14]
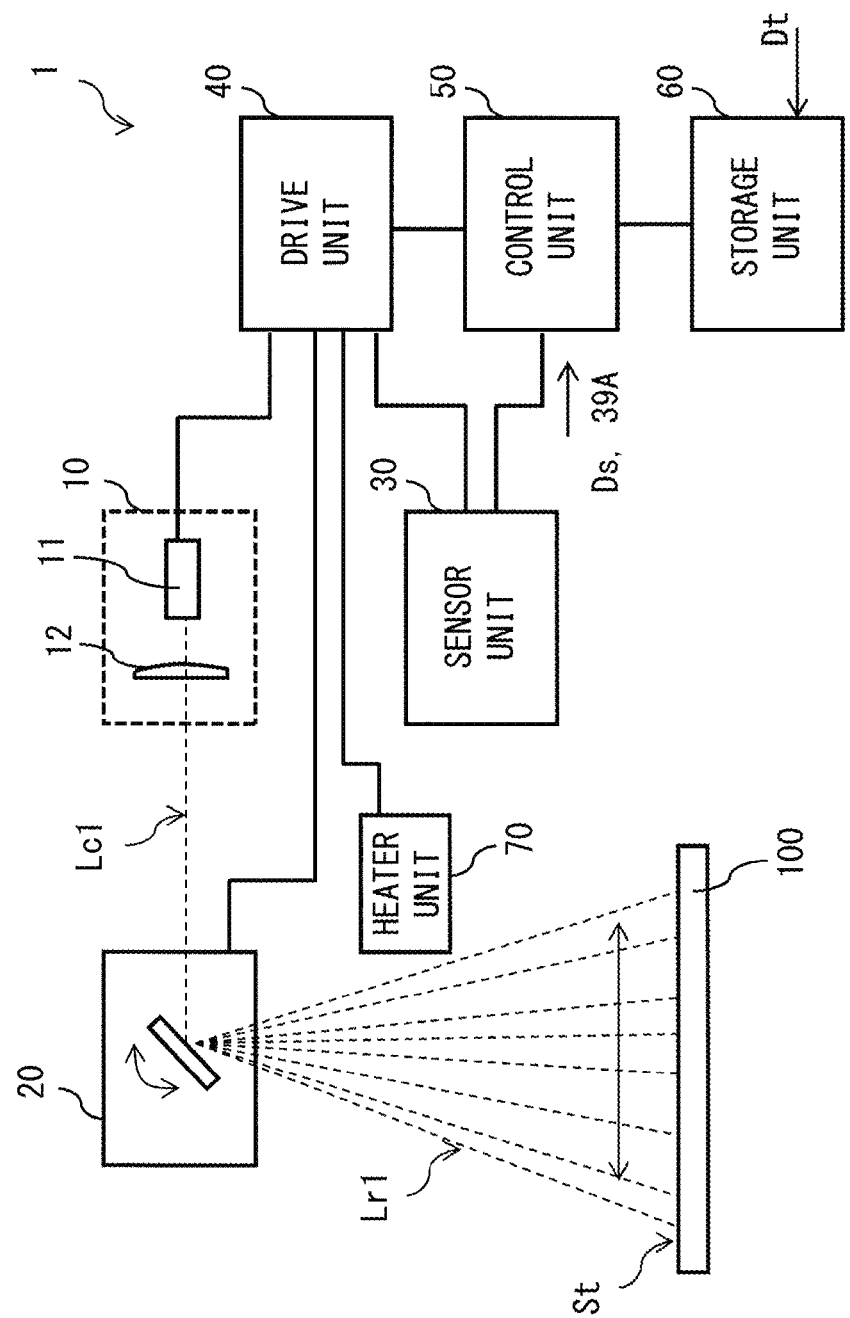

[ FIG. 15 ]
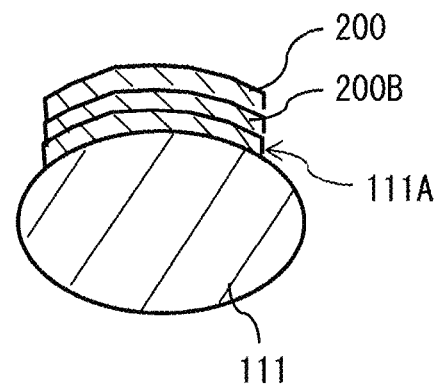
[ FIG. 16 ]
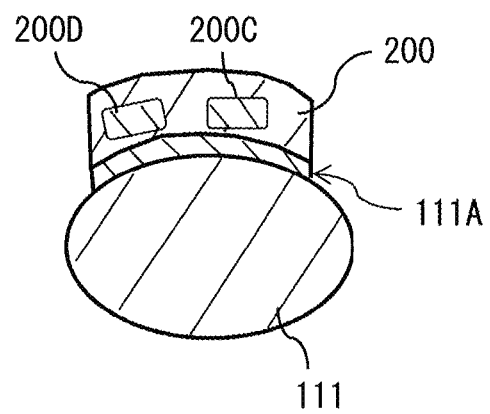

[ FIG. 17 ]
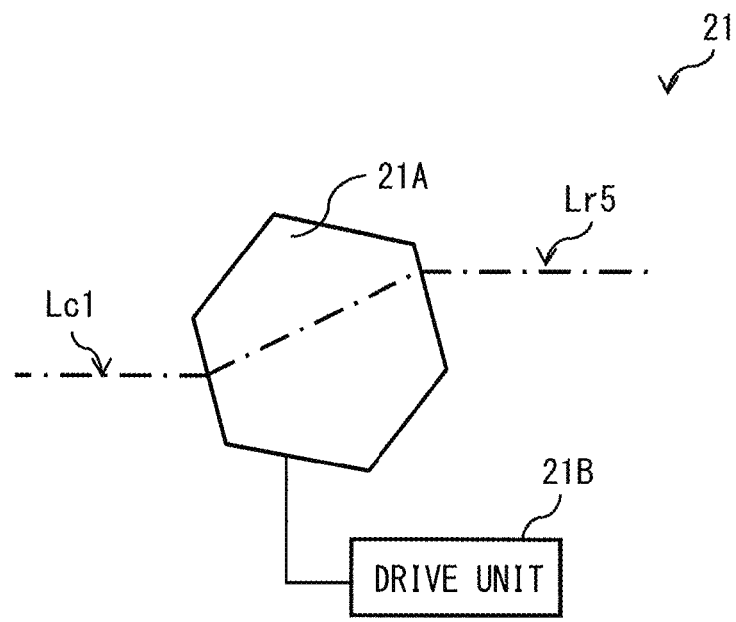
[ FIG. 18 ]
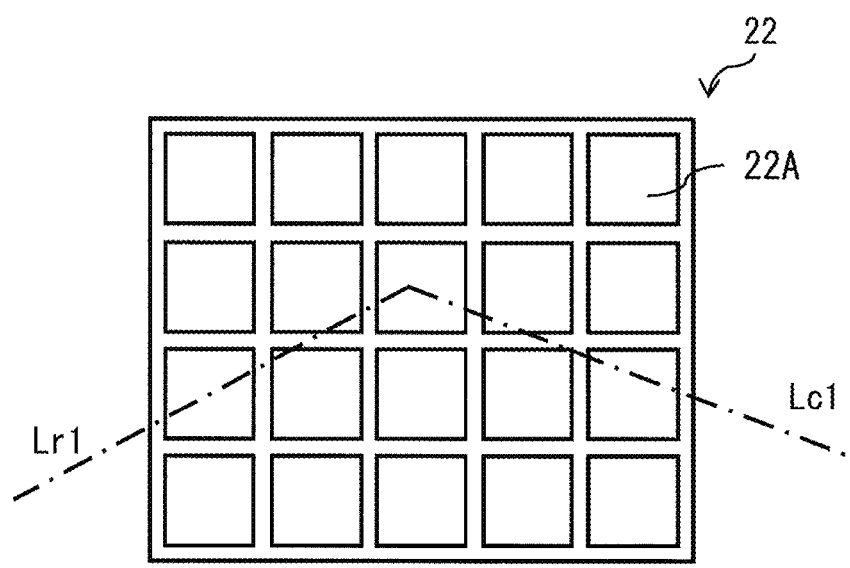

[ FIG. 19 ]
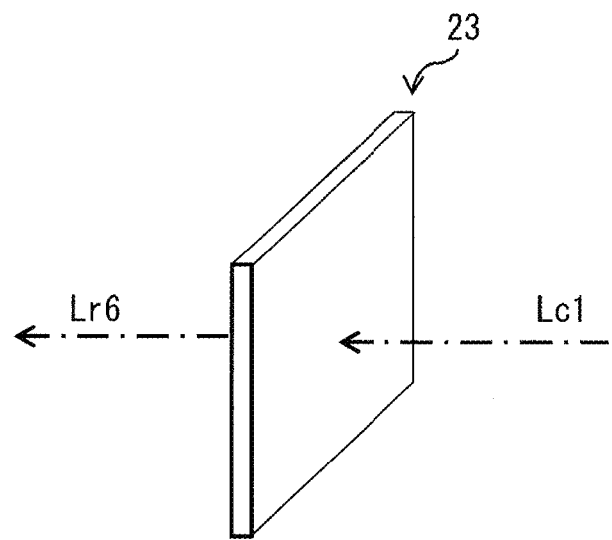
[ FIG. 20 ]
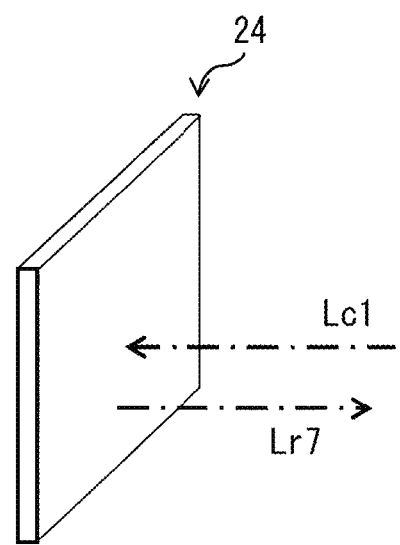

OPTICAL SHAPING APPARATUS AND METHOD OF MANUFACTURING SHAPED OBJECT

CROSS-REFERENCE TO RELATED APPLICATIONS

This application claims the benefit under 35 U.S.C. § 371 as a U.S. National Stage Entry of International Application No. PCT/JP2015/076519, filed in the Japanese Patent Office as a Receiving Office on Sep. 17, 2015, which claims priority to Japanese Patent Application Number JP2014-213380, filed in the Japanese Patent Office on Oct. 20, 2014, each of which is hereby incorporated by reference in its entirety.

TECHNICAL FIELD

The technology relates to an optical shaping apparatus that forms a shaped object with utilization of a change in properties of a resin by light irradiation. Moreover, the technology relates to a method of manufacturing a shaped object that utilizes the change in the properties of the resin by the light irradiation.

BACKGROUND ART

So far various methods have been disclosed to shape a solid object on the basis of a three-dimensional model created with CAD (computer aided design). For example, a disclosure has been made that includes slicing the three-dimensional model into a number of layers of thin cross-sectional bodies, and performing a light emission control of a laser and a scan with a beam, in accordance with coordinate data of each of the cross-sectional bodies. The laser focuses on a surface of a photosensitive resin (for example, refer to PTLs 1 and 2). Moreover, for example, a disclosure has been made that includes performing, in accordance with the coordinate data of each of the cross-sectional bodies as mentioned above, an injection control of an ink and a scan with a head, while causing the ink to be hardened by the light irradiation (for example, refer to PTLs 3 and 4).

Moreover, so far various methods have been disclosed to harden a photo-setting resin applied to a fingernail or a nail chip, by the light irradiation. For example, a disclosure has been made that includes printing a color ink on the fingernail or the nail chip in accordance with image data, thereafter printing a surface coating, and hardening them by the light irradiation (refer to PTL 5).

CITATION LIST

Patent Literature

PTL 1: Japanese Unexamined Patent Application Publication No. 1981-144478
PTL 2: Japanese Unexamined Patent Application Publication No. 2003-340923
PTL 3: Japanese Unexamined Patent Application Publication No. 1990-307730
PTL 4: Japanese Unexamined Patent Application Publication No. 1991-39234
PTL 5: Japanese Unexamined Patent Application Publication No. 2012-232041

SUMMARY OF THE INVENTION

However, the methods described in PTLs 1 to 5 are based on a premise that the solid object or the printed object is formed on a flat surface. Accordingly, it is difficult to precisely form the solid object or the printed object on a curved surface.

It is therefore desirable to provide an optical shaping apparatus and a method of manufacturing a shaped object that make it possible to precisely form a solid object not only on a flat surface but also on a curved surface.

An optical shaping apparatus according to an embodiment of the technology includes: a light source unit that outputs collimated light; an optical function unit that is disposed on an optical path of the collimated light and modulates the optical path or a phase of the collimated light; and a control unit that controls operation of the optical function unit, to irradiate a target surface with modulated light produced in the optical function unit.

A method of manufacturing a shaped object according to an embodiment of the technology includes two steps as follows.

(A) a first step that includes modulating an optical path or a phase of collimated light outputted from a light source unit, to produce modulated light of the collimated light, while irradiating a surface of a photosensitive resin applied to a body subject to stacking, with the modulated light produced, to form a first resin hardened layer (B) a second step that includes modulating the optical path or the phase of the collimated light outputted from the light source unit, to produce the modulated light of the collimated light, while irradiating a surface of a photosensitive resin newly applied to the first resin hardened layer formed by the first step, to form a second resin hardened layer In the optical shaping apparatus and the method of manufacturing the shaped object according to the embodiments of the technology, the collimated light is used as light with which the target surface is irradiated. The collimated light is substantially focus-free light. Accordingly, defocusing at the target surface is less liable to occur, even in a case in which the target surface is a curved surface.

According to the optical shaping apparatus and the method of manufacturing the shaped object of the embodiments of the technology, the use of the collimated light as the light with which the target surface is irradiated allows the defocusing at the target surface to be less liable to occur, even in the case in which the target surface is the curved surface. This makes it possible to precisely harden a desired place out of a photo-setting resin applied to the target surface, regardless of a surface shape of the target surface. Hence, it is possible to precisely form the solid object not only on the flat surface but also on the curved surface. It is to be noted that effects of the technology are not necessarily limited to the effects described above, and may include any of effects that are described herein.

BRIEF DESCRIPTION OF DRAWING

FIG. 1 is a diagram that illustrates one example of a schematic configuration of an optical shaping apparatus according to one embodiment of the technology.

FIG. 2A is a view that illustrates one example of a cross-sectional configuration of a body subject to stacking in FIG. 1.

FIG. 2B is a view that illustrates one example of the cross-sectional configuration of the body subject to the stacking in FIG. 1.

FIG. 3A is a view that conceptually illustrates one example of position data.

FIG. 3B is a view that conceptually illustrates one example of the position data.

FIG. 4 is a diagram that illustrates one specific example of the optical shaping apparatus in FIG. 1.

FIG. 5A is a view that illustrates one example of a cross-sectional configuration of a shaped object.

FIG. 5B is a view that conceptually illustrates one example of coordinate data.

FIG. 6A is a view that conceptually illustrates one example of the coordinate data after correction.

FIG. 6B is a view that conceptually illustrates one example of the coordinate data after the correction.

FIG. 6C is a view that conceptually illustrates one example of the coordinate data after the correction.

FIG. 7 is a diagram that illustrates one example of an operation procedure of the optical shaping apparatus 1 in FIG. 1.

FIG. 8A is a view that illustrates one example of a manufacturing process of the shaped object.

FIG. 8B is a view that illustrates one example of the manufacturing process following FIG. 8A.

FIG. 8C is a view that illustrates one example of the manufacturing process following FIG. 8B.

FIG. 8D is a view that illustrates one example of the manufacturing process following FIG. 8C.

FIG. 9 is a diagram that illustrates one modification example of the optical shaping apparatus in FIG. 1.

FIG. 10A is a diagram that illustrates one mode of the optical shaping apparatus in FIG. 9.

FIG. 10B is a diagram that illustrates one mode of the optical shaping apparatus in FIG. 9.

FIG. 10C is a diagram that illustrates one mode of the optical shaping apparatus in FIG. 9.

FIG. 10D is a diagram that illustrates one mode of the optical shaping apparatus in FIG. 9.

FIG. 11 is a view that illustrates one example of the cross-sectional configuration of the shaped object.

FIG. 12 is a diagram that illustrates one modification example of the optical shaping apparatus in FIG. 1.

FIG. 13 is a view that illustrates one example of the cross-sectional configuration of the shaped object.

FIG. 14 is a diagram that illustrates one modification example of the optical shaping apparatus in FIG. 1.

FIG. 15 is a view that illustrates one modification example of the cross-sectional configuration of the shaped object.

FIG. 16 is a view that illustrates one modification example of the cross-sectional configuration of the shaped object.

FIG. 17 is a view that illustrates one example of an optical path modulating element.

FIG. 18 is a view that illustrates one example of a digital mirror device.

FIG. 19 is a view that illustrates one example of a transmission liquid crystal panel.

FIG. 20 is a view that illustrates one example of a reflection liquid crystal panel.

MODES FOR CARRYING OUT THE INVENTION

In the following, some embodiments of the technology are described in detail with reference to the drawings. It is to be noted that description is made in the following order.

1. EMBODIMENT (OPTICAL SHAPING APPARATUS)

An example in which correction of coordinate data is made before a scan

An example in which a near infrared sensor is provided as a distance sensor

2. MODIFICATION EXAMPLES (OPTICAL SHAPING APPARATUS)

Modification Example A: an example in which the correction of the coordinate data is made during the scan as well Modification Example B: an example in which an imaging device is provided as the distance sensor Modification Example C: an example in which position data Ds is derived in a control unit Modification Example D: an example in which a shaped object distributes itself at a plurality of places on a target surface Modification Example E: an example in which a light emitting element for peeling off of the shaped object is provided Modification Example F: an example in which a heater unit for the peeling off of the shaped object is provided Modification Example G: an example in which the target surface is other surfaces than a surface of a fingernail Modification Example H: an example in which the shaped object is subject to coloring Modification Example I: an example in which an electronic device or other things is incorporated inside the shaped object Modification Example J: an example in which a photosensitive resin is a positive resin Modification Example K: an example with the use of an optical path converting element instead of a reflection mirror Modification Example L: an example in which the shaped object is shaped as a thin sheet Modification Example M: an example with the use of a digital mirror device Modification Example N: an example with the use of a transmission liquid crystal panel Modification Example O: an example with the use of a reflection liquid crystal panel

1. Embodiment

[Configuration]

Description is given first of an optical shaping apparatus 1 according to one embodiment of the technology. FIG. 1 illustrates one example of a schematic configuration of the optical shaping apparatus 1. The optical shaping apparatus 1 may be an apparatus that performs exposure with respect to a surface (a target surface St) of a photosensitive resin applied to a surface of a body subject to stacking 100, and be an apparatus that forms a shaped object with the utilization of a change in properties of a resin by light irradiation. The target surface St corresponds to one specific example of a "target surface" of the technology.

The body subject to the stacking 100 may be, for example, a thumb 111 as illustrated in FIG. 2A, or alternatively four fingers (an index finger 112, a middle finger 113, a third finger 114, and a little finger 115) as illustrated in FIG. 2B. In an alternative, the body subject to the stacking 100 may be, for example, an electronic apparatus such as a smartphone. In a case in which the body subject to the stacking 100 is the thumb 111 as illustrated in FIG. 2A, the target surface St may be the surface of the photosensitive resin applied to a surface of a fingernail 111A of the thumb 111. In a case in which the body subject to the stacking 100 is the four fingers as illustrated in FIG. 2B, the target surface St may be the surface of the photosensitive resin applied to surfaces of fingernails 112A, 113A, 114A, and 115A of the four fingers. The surfaces of the fingernails 111A to 115A may be generally curved surfaces. Before start of the light irradiation, the target surface St may be, for example, the surface of the photosensitive resin applied to the surface of, for example, the fingernail 111A. After a start of the stacking of part of the shaped object on the surface of, for example, the fingernail 111A, the target surface St may be the surface of the photosensitive resin applied to a surface of unevenness including a structure in the middle of the stacking.

The optical shaping apparatus 1 may include, for example, as illustrated in FIG. 1, a light source unit 10, a movable mirror 20, a sensor unit 30, a drive unit 40, a control unit 50, and a storage unit 60. The optical shaping apparatus 1 corresponds to one specific example of an "optical shaping apparatus" of the technology. The light source unit 10 corresponds to one specific example of a "light source unit" of the technology. The movable mirror 20 corresponds to one specific example of an "optical function unit" and one specific example of an "optical path modulating element" of the technology. The sensor unit 30 corresponds to one specific example of a "sensor unit" of the technology. The control unit 50 corresponds to one specific example of a "control unit" of the technology.

The light source unit 10 may output collimated light, on the basis of a drive signal from the drive unit 40. The light source unit 10 may include, for example, a light emitting element 11 and a collimator lens 12. The light emitting element 11 may output ultraviolet light. The collimator lens 12 may be disposed on an optical path of the ultraviolet light. The light emitting element 11 corresponds to one specific example of a "light emitting element" of the technology. The collimator lens 12 corresponds to one specific example of a "collimator" of the technology.

The light emitting element 11 may include, for example, one or more semiconductor lasers, or alternatively one or more light emitting diodes. The semiconductor laser may be a general one, or alternatively a special one such as an SHG (Second Harmonic Generation) laser. The light emitting diode may be a general one, or alternatively, for example, a special one such as a super luminescent diode (SLD). The semiconductor laser or the light emitting diode that outputs the ultraviolet light may be so constituted that the semiconductor laser or the light emitting diode includes, for example, a GaInN-base semiconductor that is able to output light of a 405 nm band. The semiconductor laser that outputs the ultraviolet light may be constituted by a stack of, for example, the following layers, on an n-type GaN substrate: an n-type AlGaN clad layer, an n-type GaN guide layer, a GaInN multiple quantum well layer, a p-type AlGaN electron blocking layer, a p-type GaN guide layer, a p-type AlGaN clad layer, and a p-type GaN contact layer. Generally, in the semiconductor laser, a beam spot diameter may be smaller of a beam spot diameter of the light emitting diode. Accordingly, in a case in which the one or more semiconductor lasers are used as the light emitting element 11, the beam spot diameter of the light emitting element 11 becomes extremely small. This makes it possible to easily obtain high energy density. Moreover, in a case in which the one or more semiconductor lasers or the one or more light emitting diodes are used as the light emitting element 11, downsizing of the light emitting element 11 becomes easier, as compared to a case with the use of a lamp as the light emitting element 11.

The collimator lens 12 may turn light outputted from the light emitting element 11 into a parallel light flux (collimated light Lc1) with use of refraction by a lens. It is to be noted that the light source unit 10 may include, instead of the collimator lens 12, an optical component that turns the light outputted from the light emitting element 11 into the parallel light flux with use of reflection by a mirror.

The movable mirror 20 may be disposed on an optical path of the collimated light Lc1 outputted from the light source unit 10. The movable mirror 20 may modulate (displace) an optical path of light entering the relevant movable mirror 20. In one specific example, the movable mirror 20 may reflect the collimated light Lc1 entering the relevant movable mirror 20. The movable mirror 20 may reflect the collimated light Lc1 outputted from the light source unit 10, while causing displacement of the movable mirror 20 on the basis of the drive signal from the drive unit 40, thereby to modulate (displace) the optical path of the collimated light Lc1. The movable mirror 20 may thereby allow the collimated light Lc1 (reflected light Lr1 produced at the movable mirror 20) to perform a scan over the target surface St. The reflected light Lr1 corresponds to one specific example of "modulated light" of the technology. The movable mirror 20 may be so constituted that the movable mirror 20 includes, for example, a MEMS (Micro Electro Mechanical Systems) mirror, a polygon mirror, or a galvanometer mirror.

The sensor unit 30 may acquire position data Ds of a predetermined surface including the target surface St, and output the position data Ds acquired to the control unit 50. The position data Ds may be three-dimensional coordinate data of the predetermined surface including the target surface St. As conceptually illustrated in FIG. 3A, the position data Ds may be, for example, the three-dimensional coordinate data of the predetermined surface including the target surface St. Accordingly, the sensor unit 30 may divide the predetermined surface including the target surface St into a plurality of elements, and acquire three-dimensional coordinates of each of the divided elements. It is to be noted that the position data Ds may be a group of three-dimensional coordinates solely of the target surface St. In this case, as conceptually illustrated in FIG. 3B, the position data Ds may be, for example, the three-dimensional coordinates solely of the target surface St. The sensor unit 30 may divide solely the target surface St into the plurality of elements, and acquire the three-dimensional coordinates of each of the divided elements.

The sensor unit 30 may be so constituted that the sensor unit 30 includes a distance sensor. The sensor unit 30 may be so constituted that the sensor unit 30 includes, for example, a near infrared sensor of a TOF (Time Of Flight) system. The TOF system refers to, for example, measurement of a distance from the predetermined surface including the target surface St to the movable mirror 20 on the basis of a time difference between pulse light beams respectively obtained by two light receiving elements. As illustrated in FIG. 4, the sensor unit 30 may include, for example, a light emitting element 31, a collimator lens 32, a half mirror 33, a total reflection mirror 34, and a dichroic mirror 35. The light emitting element 31 may output near infrared light. The collimator lens 32, the half mirror 33, the total reflection mirror 34, and the dichroic mirror 35 may be disposed on an optical path of the near infrared light. As illustrated in FIG. 4, the sensor unit 30 may further include, for example, a time difference detection circuit 36 and two light receiving elements 37 and 38. The two light receiving elements 37 and 38 may be coupled to an input terminal of the time difference detection circuit 36.

The light emitting element 31 may be so constituted that the light emitting element 31 includes, for example, a semiconductor that is able to output light of an 833 nm band. The collimator lens 32, the half mirror 33, the total reflection mirror 34, and the dichroic mirror 35 may be disposed in the order named, toward a direction of traveling of the near infrared light outputted from the light emitting element 31. The dichroic mirror 35 may be also disposed on the optical path of the light outputted from the light emitting element 11. The collimator lens 32 may turn the near infrared light outputted from the light emitting element 31 into a parallel light flux (collimated light Lc2) with the use of the refraction by the lens. The half mirror 33 may transmit part of the collimated light Lc2 and reflect part of the collimated light Lc2 toward the light receiving element 37. The total reflection mirror 34 may cause total reflection of light that has passed through the half mirror 33, out of the collimated light Lc2. The dichroic mirror 35 may transmit the collimated light Lc1 and reflect the collimated light Lc2 toward the movable mirror 20.

The light receiving element 37 may receive the light reflected by the half mirror 33, out of the collimated light Lc2. The light receiving element 38 may receive light reflected by the target surface St (reflected light Lr3), out of the collimated light Lc2. The light receiving elements 37 and 38 may be, for example, photodiodes. The time difference detection circuit 36 may derive the time difference between light beams (the pulse light beams) respectively obtained from the two light receiving elements 37 and 38, and make the measurement of a distance 36A from a region including the target surface St to the movable mirror 20, on the basis of the time difference derived. The time difference detection circuit 36 may output the distance 36A to the control unit 50.

The drive unit 40 may drive the light source unit 10, the movable mirror 20, and the sensor unit 30, on the basis of a control signal from the control unit 50. The storage unit 60 may be so constituted that the storage unit 60 is able to store, for example, coordinate data Dt. A device including the storage unit 60 and the control unit 50 may be constituted by, for example, the electronic apparatus such as the smartphone (hereinbelow referred to as the "electronic apparatus" as appropriate). The coordinate data Dt may include, for example, representation of a shape and a size of a shaped object 200 as illustrated in FIG. 5A with a plurality of pieces of coordinate data. The coordinate data Dt may further include color information associated with each piece of the coordinate data. In a case in which the shaped object 200 is assumed to be constituted by a number of sliced layers of thin cross-sectional bodies 210 of the relevant shaped object 200, a shape and a size of each of the cross-sectional bodies 210 may be represented by, for example, horizontal cross-section data Dthi. In other words, as conceptually illustrated in FIG. 5B, the coordinate data Dt may be constituted by, for example, a plurality of pieces of the horizontal cross-section data Dthi. The horizontal cross-section data Dthi may be constituted by a plurality of pieces of three-dimensional coordinate data, or alternatively the horizontal cross-section data Dthi may be constituted by a plurality of pieces of two-dimensional coordinate data. However, in one preferable example, in a case in which the horizontal cross-section data Dthi is constituted by the plurality of pieces of two-dimensional coordinate data, the horizontal cross-sectional data Dthi may be somehow associated with information on a heightwise direction inside the shaped object 200.

The control unit 50 may control the light source unit 10, the movable mirror 20, and the sensor unit 30, through the drive unit 40. The control unit 50 may control operation of the movable mirror 20, through the drive unit 40, to irradiate the target surface St with the collimated light Lc1 (the reflected light Lr1). In one specific example, the control unit 50 may displace the movable mirror 20, through the drive unit 40, and allow the movable mirror 20 to displace the optical path, to allow the collimated light Lc1 (the reflected light Lr1) to perform the scan over the target surface St. Furthermore, the control unit 50 may read the coordinate data Dt from the storage unit 60, and thereafter control light emission of the light source unit 10 on the basis of the coordinate data Dt, through the drive unit 40. The control unit 50 may derive the position data Ds on the basis of the distance 36A acquired from the time difference detection circuit 36.

The control unit 50 may control the light emission of the light source unit 10, on the basis of the position data Ds and the coordinate data Dt. The control unit 50 may control the light emission of the light source unit 10, on the basis of the position data Ds acquired before the scan is performed (e.g., before the light emission unit 10 performs the light emission), and the coordinate data Dt. In one specific example, the control unit 50 may make correction of the coordinate data Dt on the basis of the position data Ds acquired before the scan is performed (e.g., before the light emission unit 10 performs the light emission), and control the light emission of the light source unit 10, on the basis of coordinate data Dt' thereby obtained.

As illustrated in FIG. 6A, for example, the control unit 50 may make, on the basis of the position data Ds, correction that includes omission of part of the coordinate data Dt. At this occasion, the coordinate data Dt' obtained by the correction may be similar to the coordinate data Dt, in that the coordinate data Dt' is constituted by the plurality of pieces of the horizontal cross-section data Dthi. But the coordinate data Dt' may correspond to data devoid of data of a part that corresponds to a bottom part, out of the coordinate data Dt. In one alternative, as illustrated in FIG. 6B, for example, the control unit 50 may make, on the basis of the position data Ds, correction that includes addition of dummy data to the coordinate data Dt. At this occasion, the coordinate data Dt' obtained by the correction may be similar to the coordinate data Dt, in that the coordinate data Dt' is constituted by the plurality of pieces of the horizontal cross-section data Dthi. But the coordinate data Dt' may correspond to data with the dummy data added to the bottom part of the coordinate data Dt. In another alternative, as illustrated in FIG. 6C, for example, the control unit 50 may make the correction of the coordinate data Dt, on the basis of the position data Ds, to a plurality of pieces of imitative cross-section data Dtci that follow a surface shape of the target surface St. In another alternative, the control unit 50 may make correction of the horizontal cross-section data Dthi, on the basis of the position data Ds, to the imitative cross-section data Dtci that follows the surface shape of the target surface St. A plurality of pieces of the imitative cross-section data Dtci obtained by the correction may constitute the coordinate data Dt'. The control unit 50 may control the light emission of the light source unit 10, on the basis of the coordinate data Dt' obtained by the correction as described above. The coordinate data Dt' corresponds to one specific example of "coordinate data after the correction" of the technology. It is to be noted that in one preferable example, the imitative cross-section data Dtci may strictly follow the surface shape of the target surface St. But the imitative cross-section data Dtci may be curved-surface cross-section data that follows the surface shape of the target surface St in rough.

[Operation]

Description is given next of one example of a fabrication procedure of the shaped object 200 with utilization of the optical shaping apparatus 1. FIG. 7 illustrates one example of an operation procedure of the optical shaping apparatus 1. First, the optical shaping apparatus 1 may acquire the coordinate data Dt (step S101). For example, a user may select a design of the shaped object 200, and input the coordinate data Dt of the selected design to the optical shaping apparatus 1. In an alternative, the user himself or herself may depict a design, and input the coordinate data Dt of the depicted design to the optical shaping apparatus 1. The optical shaping apparatus 1 may acquire the coordinate data Dt through, for example, the selection by the user in the method as described above. In an alternative, the optical shaping apparatus 1 may acquire the coordinate data Dt through, for example, the input from the user in the method as described above.

In a case in which the device including the storage unit 60 and the control unit 50 is constituted by the electronic apparatus such as the smartphone, the optical shaping apparatus 1 may display a plurality of designs on a screen of the electronic apparatus, and allow the user to select one design from among the designs. The optical shaping apparatus 1 may download, through Internet, the coordinate data Dt of the design selected by the user. Moreover, in a case in which the screen of the electronic apparatus is provided with a touch input function, the optical shaping apparatus 1 may allow the user to depict the design on the screen of the electronic apparatus, to accept the input of the design from the user. At this occasion, the optical shaping apparatus 1 may generate the coordinate data Dt on the basis of the design inputted from the user.

Next, the user may apply, for example, on the surface of the fingernail 111A of the thumb 111, a photosensitive resin 210A in which a colored pigment or a dye is contained (FIG. 8A). The photosensitive resin 210A may be, for example, a resin that is hardened by, at least, the ultraviolet light outputted from the light emitting element 11. In a case in which the optical shaping apparatus 1 includes a mechanism that applies the photosensitive resin 210A to the body subject to the stacking 100, the optical shaping apparatus 1 may apply the photosensitive resin 210A to, for example, the surface of the fingernail 111A of the thumb 111, in accordance with a request for application of a photosensitive resin from the user.

Next, the user may request the optical shaping apparatus 1 to perform a process of the photosensitive resin 210A, with the thumb 111 inserted in a predetermined place of the optical shaping apparatus 1. Upon input of an instruction of the process of the photosensitive resin 210A from the user, the optical shaping apparatus 1 may control the light emission of the light source unit 10, on the basis of the position data Ds and the coordinate data Dt.

In one specific example, first, the optical shaping apparatus 1 may acquire the position data Ds, before performing the scan with the reflected light Lr1 (e.g., before the light emission unit 10 performs the light emission) (step S102). The optical shaping apparatus 1 may acquire the position data Ds, for example, as follows. First, the control unit 50 may generate a control signal that allows the light emitting element 31 to perform pulse light emission, and allows the movable mirror 20 to operate. The control unit 50 may output the control signal generated, to the drive unit 40. On the basis of the control signal inputted from the control unit 50, the drive unit 40 may allow the light emitting element 31 to perform the pulse light emission, and allow the movable mirror 20 to operate. Thus, pulse light outputted from the light emitting element 31 may be turned into the collimated light Lc2 by the collimator lens 32. The collimated light Lc2 may be reflected by the movable mirror 20, and the reflected light Lr2 produced at the movable mirror 20 may perform the scan over a predetermined surface including the surface of the fingernail 111A of the thumb 111. As a result, out of the reflected light Lr2, the light reflected by, for example, the surface of the photosensitive resin on the surface of the fingernail 111A of the thumb 111 (the reflected light Lr3) may be detected by the light receiving element 38. Meanwhile, out of the collimated light Lc2, the light reflected by the half mirror 33 may be detected by the light receiving element 37. The time difference detection circuit 36 may derive the time difference (the time difference of pulses) between the reflected light Lr3 detected by the light receiving element 38 and the reflected light detected by the light receiving element 37. On the basis of the time difference derived, the time difference detection circuit 36 may make the measurement of the distance from the predetermined surface including the target surface St to the movable mirror 20. Moreover, the time difference detection circuit 36 may derive the position data Ds of the region including the target surface St, on the basis of the distance from the predetermined surface including the target surface St to the movable mirror 20.

Next, the optical shaping apparatus 1 may make the correction of the coordinate data Dt, on the basis of the position data Ds acquired before performing the scan with the reflected light Lr1 (e.g., before the light emission unit 10 performs the light emission) (step S103). For example, the optical shaping apparatus 1 may make the correction as described above (e.g., refer to the figures such as FIG. 6A, 6B, or 6C) on the coordinate data Dt, to derive the coordinate data Dt' from the coordinate data Dt. At this occasion, the optical shaping apparatus 1 may make correction on the coordinate data Dt or the coordinate data Dt', as necessary. The correction may correspond to scaling up, scaling down, or amendment of an aspect ratio, or any combination thereof, of the shaped object 200.

In the case in which the device including the storage unit 60 and the control unit 50 is constituted by the electronic apparatus such as the smartphone, the optical shaping apparatus 1 may display, on the screen of the electronic apparatus, an image (hereinbelow referred to as an "image for adjustment") that gives the user an intuitive understanding of a position and a size of the shaped object 200 to be formed on the fingernail 111A. For example, the optical shaping apparatus 1 may display, on the screen of the electronic apparatus, the image (the image for adjustment) in which an image of the shaped object 200 generated on the basis of the coordinate data Dt is superimposed on an image of the fingernail 111A generated on the basis of the position data Ds. In a case in which the optical shaping apparatus 1 includes an imaging device that captures an image of the target surface St, for example, the optical shaping apparatus 1 may display, on the screen of the electronic apparatus, the image (the image for adjustment) in which the image of the shaped object 200 generated on the basis of the coordinate data Dt is superimposed on an image of the fingernail 111A captured by the imaging device as mentioned above. The imaging device that captures the image of the target surface St may be provided in the electronic apparatus. It is to be noted that the imaging device as described above may be, for example, a CMOS (Complementary Metal Oxide Semiconductor) image sensor, or a CCD (Charge Coupled Device) image sensor. Furthermore, the optical shaping apparatus 1 may amend the position of the shaped object 200 to be formed, or amend the size or the aspect ratio of the shaped object 200, in accordance with an input from the user, in a state in which the image for adjustment is being displayed.

Next, the optical shaping apparatus 1 may control the light emission of the light source unit 10, on the basis of the coordinate data Dt' (step S104). In one specific example, the optical shaping apparatus 1 may control the light emission of the light source unit 10, on the basis of the horizontal cross-section data Dthi or the imitative cross-section data Dtci. Furthermore, the optical shaping apparatus 1 may control the scan with the light emitted from the light source unit 10 done by the movable mirror 20. The optical shaping apparatus 1 may control the light emission of the light source unit 10 on the basis of one piece of the horizontal cross-section data Dthi or one piece of the imitative cross-section data Dtci, and allow the movable mirror 20 to displace the optical path of the light (the collimated light Lc1) outputted from the light source unit 10. Thus, the optical shaping apparatus 1 may allow the collimated light Lc1 (the light reflected by the movable mirror 20 (the reflected light Lr1)) to perform the scan over the surface (the target surface St) of the photosensitive resin 210A applied to the body subject to the stacking 100, and thereby form a resin hardened layer 210B (FIG. 8B). The optical shaping apparatus 1 may control, as necessary, on the basis of the coordinate data Dt', the scan with the light emitted from the light source unit 10 done by the movable mirror 20.

Upon an end of the light scan by the movable mirror 20, the optical shaping apparatus 1 may notify the user of an end of the process of the photosensitive resin 210A. The user may confirm the notification, and thereafter wipe off the non-hardened photosensitive resin 210A with alcohols (e.g., ethanol).

In a case in which fabrication of the shaped object 200 has not ended yet, the user may apply a photosensitive resin 210C in which the colored pigment or the dye is contained, to the resin hardened layer 210B (FIG. 8C). The photosensitive resin 210C may be, for example, the resin that is hardened by, at least, the ultraviolet light outputted from the light emitting element 11. In a case in which the optical shaping apparatus 1 includes a mechanism that applies the photosensitive resin 210C to a surface including the resin hardened layer 210B, the optical shaping apparatus 1 may apply the photosensitive resin 210C to, for example, the surface including the resin hardened layer 210B, in accordance with a request for application of the photosensitive resin 210C from the user.

Next, the user may have the thumb 111 inserted again in the predetermined place of the optical shaping apparatus 1, and thereafter request the optical shaping apparatus 1 to perform a process of the photosensitive resin 210C. Upon input of an instruction of the process of the photosensitive resin 210C from the user, the optical shaping apparatus 1 may execute again step S104 as described above. For example, the optical shaping apparatus 1 may control the light emission of the light source unit 10, on the basis of a different piece of the horizontal cross-section data Dthi from that of the preceding process or a different piece of the imitative cross-section data Dtci from that of the preceding process, and allow the movable mirror 20 to displace the optical path of the light (the collimated light Lc1) outputted from the light source unit 10. Thus, the optical shaping apparatus 1 may allow the collimated light Lc1 (the light reflected by the movable mirror 20 (the reflected light Lr1)) to perform the scan over the surface (the target surface St) of the photosensitive resin 210C, and thereby form a resin hardened layer 210D (FIG. 8D).

The optical shaping apparatus 1 may execute again step S102 as described above and step S103 as described above, after the application of the photosensitive resin 210C. However, in this case, the optical shaping apparatus 1 may determine again whether or not the position data Ds acquired before performing the scan with the reflected light Lr1 (hereinbelow referred to as "update data") is consistent with the horizontal cross-section data Dthi or the imitative cross-section data Dtci that is to be used in the light emission control in step S104 as described above (hereinbelow referred to as "target data to be used"). For example, the optical shaping apparatus 1 may make a determination on whether or not XY coordinates (coordinates in front-rear and right-left directions) of an outline of the target surface St included in the update data, and the XY coordinates (the coordinates in the front-rear and right-left directions) of an outline of the shaped object 200 included in the target data to be used are within a prescribed error. In an alternative example, the optical shaping apparatus 1 may make a determination on whether or not a Z coordinate (a coordinate in a heightwise direction) of the target surface St included in the update data, and the Z coordinate (the coordinate in the heightwise direction) of the shaped object 200 included in the target data to be used are within a prescribed error. In another alternative, the optical shaping apparatus 1 may make the two determinations as described above. As a result, in a case with a determination result of inconsistency, the optical shaping apparatus 1 may make correction of the horizontal cross-section data Dthi or the imitative cross-section data Dtci as a target to be used, so as to allow the position data Ds newly acquired to be consistent with the horizontal cross-section data Dthi or the imitative cross-section data Dtci as the target to be used. In a case with a determination result of consistency, the optical shaping apparatus 1 may make no correction of the horizontal cross-section data Dthi or the imitative cross-section data Dtci as the target to be used.

[Effects]

Description is given next of effects of a method of manufacture with the optical shaping apparatus 1.

In an existing optical shaping apparatus, there is a premise that a solid object or a printed object is formed on a flat surface. Accordingly, it is difficult to precisely form the solid object or the printed object on a curved surface. In contrast, this embodiment involves utilizing the collimated light as the light with which the scan over the target surface St is made. The collimated light is substantially focus-free light. Accordingly, defocusing at the target surface St is less liable to occur, in a case in which the movable mirror 20 allows the collimated light to perform the scan over the target surface St. As a result, it is possible to precisely harden a desired place out of the photosensitive resin applied to the body subject to the stacking, regardless of the surface shape of the target surface St. Hence, it is possible to precisely form the shaped object 200 not only on the flat surface but also on the curved surface.

Moreover, this embodiment may involve allowing the movable mirror 20 to cause the reflected light Lr1 to perform the scan over the target surface St. Accordingly, in a case in which the body subject to the stacking 100 is a human finger, it is possible to reduce possibility of harm to health of the finger, as compared to a case in which the whole body subject to the stacking 100 is irradiated with light.

Furthermore, in this embodiment, in a case in which the light emitting element 11 is so constituted that the light emitting element 11 includes the one or more semiconductor lasers, it is possible to easily obtain the high energy density, thanks to the extremely small beam spot diameter of the light emitting element 11. This makes it possible to cause the change in the properties of the photosensitive resin, and furthermore, to form the highly precise shaped object 200.

2. Modification Examples of First Embodiment

Modification Example A

In the forgoing embodiment, the optical shaping apparatus 1 may acquire the position data Ds solely before the scan with the reflected light Lr1. However, the optical shaping apparatus 1 may acquire the position data Ds in the middle of the scan with the reflected light Lr1 as well. In this case, the optical shaping apparatus 1 may control the light emission of the light source unit 10, on the basis of the position data Ds acquired during the scan with the reflected light Lr1 (e.g., in the middle of the light emission of the light emission unit 10), and the coordinate data Dt. In one specific example, first, the optical shaping apparatus 1 may acquire, in step S104, the position data Ds at predetermined timing intervals during the scan with the reflected light Lr1. Next, the optical shaping apparatus 1 may determine whether or not the position data Ds acquired during the scan with the reflected light Lr1 is consistent with the position data Ds acquired before the scan with the reflected light Lr1. A method of the determination may be similar to the method of the determination in the forgoing embodiment. As a result, in the case with the determination result of the inconsistency, the optical shaping apparatus 1 may make the correction of the horizontal cross-section data Dthi or the imitative cross-section data Dtci that is engaged, so as to allow the position data Ds acquired during the scan with the reflected light Lr1 to be consistent with the horizontal cross-section data Dthi or the imitative cross-section data Dtci that is engaged. A method of the correction may be similar to the method of the correction in the forgoing embodiment. In the case with the determination result of the consistency, the optical shaping apparatus 1 may make no correction of the horizontal cross-section data Dthi or the imitative cross-section data Dtci that is engaged.

As described, in this modification example, the position data Ds may be acquired not only before the scan with the reflected light Lr1 but also during the scan with the reflected light Lr1. The horizontal cross-section data Dthi or the imitative cross-section data Dtci may be corrected on the basis of the position data Ds acquired. This makes it possible to precisely cause the change in the properties of the predetermined place out of the photosensitive resin applied to the body subject to the stacking 100, even in a case in which the target surface St is displaced during the scan with the reflected light Lr1. Hence, it is possible to precisely form the shaped object 200 even in the case in which the target surface St is displaced during the scan with the reflected light Lr1.

Modification Example B

In the forgoing embodiment and its modification example, the optical shaping apparatus 1 may include the near infrared sensor as the distance sensor. However, the optical shaping apparatus 1 may include an image sensor as the distance sensor. For example, as illustrated in FIG. 9, in the optical shaping apparatus 1, the sensor unit 30 may include an imaging device 39 that is able to capture an image of the region including the target surface St. The imaging device 39 may be so constituted that the imaging device 39 includes a twin-lens camera. The sensor unit 30 may output a stereo image (image data 39A) obtained in the imaging device 39, to the control unit 50. The control unit 50 may derive, by triangulation, "a distance from the imaging device 39 to the region including the target surface St" from the image data 39A obtained in the sensor unit 30. The control unit 50 may derive the position data Ds on the basis of the distance derived, and output the position data Ds to the control unit 50.

It is to be noted that the imaging device 39 may be so constituted that the imaging device 39 includes a single-lens camera instead of the twin-lens camera. In this case, however, the sensor unit 30 may output the image data (the image data 39A) obtained by the single-lens camera, to the control unit 50. The control unit 50 may derive, with predetermined operation, "the distance from the imaging device 39 to the region including the target surface St" from the image data 39A obtained in the sensor unit 30. The control unit 50 may derive the position data Ds on the basis of the distance derived, and output the position data Ds to the control unit 50.

As described, in this modification example, the image sensor may be utilized as the distance sensor. In this case as well, it is possible to precisely derive the position data Ds. As a result, it is possible to precisely form the shaped object 200 not only on the flat surface but also on the curved surface. Moreover, it is possible to precisely form the shaped object 200 even in a case in which the target surface St is displaced during the scan with the reflected light Lr1.

It is to be noted that in this modification example, the sensor unit 30, a function, out of the drive unit 40, of driving the sensor unit 30, all or part of functions of the control unit 50, and the storage unit 60 may be constituted by, for example, the electronic apparatus such as the smartphone.

FIG. 10A illustrates one example of a schematic configuration of the optical shaping apparatus 1 according to this modification example. In FIG. 10A, the drive unit 40 may be constituted by a drive unit 40A and a drive unit 40B. The drive unit 40A may drive the light source unit 10 and the movable mirror 20. The drive unit 40B may drive the sensor unit 30. The drive unit 40A and the drive unit 40B may be constituted by separate bodies from each other. The sensor unit 30, the drive unit 40B, the control unit 50, and the storage unit 60 may be constituted by, for example, an electronic apparatus 70 such as the smartphone. The drive unit 40B may have a function of performing communication with the electronic apparatus 70. The optical shaping apparatus 1 as described in FIG. 10A may have, for example, a slot (e.g., a slot 1C as described in FIG. 10C) that detachably holds the electronic apparatus 70, or alternatively include a placement stand (a placement stand 1D as described in FIG. 10D) on or in which the electronic apparatus 70 is placed.

In the optical shaping apparatus 1 described in FIG. 10A, loading the electronic apparatus 70 in the slot (e.g., the slot 1C as described in FIG. 10C), or alternatively placing the electronic apparatus 70 on or in the placement stand (e.g., the placement stand 1D as described in FIG. 10D) makes it possible to perform the similar operation to that of the optical shaping apparatus 1 according to the forgoing embodiment. This allows for utilization of, for example, the electronic apparatus 70 provided by the user, instead of the sensor unit 30, the drive unit 40B, the control unit 50, and the storage unit 60. Hence, it is possible to manufacture the optical shaping apparatus 1 at low costs.

FIG. 10B illustrates another example of the schematic configuration of the optical shaping apparatus 1 according to this modification example. In FIG. 10B, the drive unit 40 may be constituted by the drive unit 40A and the drive unit 40B. Furthermore, the control unit 50 may be constituted by a control unit 50A and a control unit 50B. The control unit 50A may control the drive unit 40A. The control unit 50B may control the drive unit 40B. The control unit 50A and the control unit 50B may be constituted by separate bodies from each other. The control unit 50B may control operation of the control unit 50A. The sensor unit 30, the drive unit 40B, the control unit 50B, and the storage unit 60 may be constituted by, for example, an electronic apparatus 80 such as the smartphone. The control unit 50A may have a function of performing communication with the electronic apparatus 80. The optical shaping apparatus as described in FIG. 10B may have, for example, a slot (e.g., the slot 10C as described in FIG. 10C) that detachably holds the electronic apparatus 80, or alternatively include a placement stand (e.g., the placement stand 10D as described in FIG. 10D) on or in which the electronic apparatus 80 is placed. The slot 1C or the placement stand 10D may be provided in a casing 1A of the optical shaping apparatus 1. The casing 1A corresponds to one specific example of a "first casing" of the technology. The casing 1A of the optical shaping apparatus 1 may have, for example, an opening (a finger insertion slot 1B) for the insertion of the finger of the user.

In the optical shaping apparatus 1 described in FIG. 10B, loading the electronic apparatus 80 in the slot (e.g., the slot 1C as described in FIG. 10C), or alternatively placing the electronic apparatus 80 on or in the placement stand (e.g., the placement stand 1D as described in FIG. 10D) makes it possible to perform the similar operation to that of the optical shaping apparatus 1 according to the forgoing embodiment. This allows for utilization of, for example, the electronic apparatus 80 provided by the user, instead of the sensor unit 30, the drive unit 40B, the control unit 50B, and the storage unit 60. Hence, it is possible to manufacture the optical shaping apparatus 1 at low costs.

It is to be noted that in FIGS. 10C and 10D, the slot 1C or the placement stand 10D may be provided in the casing 1A of the optical shaping apparatus 1. The casing 1A may have, for example, the opening (the finger insertion slot 1B) for the insertion of the finger of the user, in addition to the slot 1C or the placement stand 10D. In FIG. 10A, the casing 1A may provide protection for the light source unit 10, the movable mirror 20, and the drive unit 40A. In FIG. 10B, the casing 1A may provide protection for the light source unit 10, the movable mirror 20, the drive unit 40A, and the control unit 50A.

Meanwhile, the electronic apparatus 70 may include a casing 70A that provides protection for the sensor unit 30, the drive unit 40B, the control unit 50, and the storage unit 60. The electronic apparatus 80 may include a casing 80A that provides protection for the sensor unit 30, the drive unit 40B, the control unit 50B, and the storage unit 60. The casing 70A or 80A, and the casing 1A may be constituted by separate bodies from each other. The casings 70A and 80A correspond to specific examples of a "second casing" of the technology.

Modification Example C

In the forgoing embodiment and the forgoing modification example B, the control unit 50 may derive the position data Ds. However, in the forgoing embodiment and the forgoing modification example B, the sensor unit 30 may derive the position data Ds.

Modification Example D

FIG. 11 illustrates one example of a cross-sectional configuration of the shaped object 200, together with the thumb 111 and a target surface 111A. In the forgoing embodiment and its modification examples A to C, the shaped object 200 may be a single solid object. However, as illustrated in FIG. 11, for example, the shaped object 200 may be so constituted that the shaped object 200 distributes itself at a plurality of places on the target surface 111A.

Modification Example E

FIG. 12 illustrates one modification example of the schematic configuration of the optical shaping apparatus 1. In the forgoing embodiment and its modification examples, the light source unit 10 may further include a light emitting element 13, a collimator lens 14, and a dichroic mirror 15. The light emitting element 13 may output light of a different wavelength band from that of the light emitting element 11. The collimator lens 14 and the dichroic mirror 15 may be disposed on an optical path of the light outputted from the light emitting element 13. The collimator lens 14 may turn the light outputted from the light emitting element 13 into a parallel light flux (collimated light Lc3) with the utilization of the refraction by the lens. The dichroic mirror 15 may transmit the light outputted from the light emitting element 11, and reflect the light outputted from the light emitting element 13 toward the movable mirror 20. The light source unit 10 may include, instead of the collimator lens 14, an optical component that turns the light outputted from the light emitting element 13 into a parallel light flux with the utilization of the reflection by the mirror. The dichroic mirror 15 may be also disposed on the optical path of the light outputted from the light emitting element 11.

The light outputted from the light emitting element 11 may be, for example, light that causes the change in the properties of the photosensitive resin used in the fabrication of the shaped object 200. The light outputted from the light emitting element 13 may be, for example, light that passes through the optical shaped object 200 and causes softening of a photo-softening resin layer 200A illustrated in FIG. 13. The photo-softening resin layer 200A may be formed, for example, in contact with the fingernail 111A, at a lowermost part of the shaped object 200. The optical shaping apparatus 1 may allow the movable mirror 20 to reflect the light outputted from the light emitting element 13, and irradiate the photo-softening resin layer 200A with light reflected by the movable mirror 20 (reflected light Lr4), to cause the softening of the photo-softening resin layer 200A. The softening of the photo-softening resin layer 200A allows the shaped object 200 to easily peel off from the fingernail 111A.

As described above, in this modification example, the light emitting element 13 for peeling off of the shaped object 200 may be provided. Hence, it is possible to allow the shaped object 200 to easily peel off from the body subject to the stacking 100.

It is to be noted that in this modification example, the light emitting element 13 may output light having a two-photon absorbing wavelength, as the light that causes modification (the softening or melting) of the photo-softening resin layer 200A. Two-photon absorption, one of non-linear optical phenomena, refers to a phenomenon in which simultaneous absorption of two photons causes absorption that corresponds to energy twice as much as light with which irradiation is made. Utilization of the two-photon absorption makes it possible to cause the softening of the photo-softening resin layer 200A with utilization of light (e.g., the near infrared light) having a half of energy of ultraviolet light. Accordingly, the light emitting element 13 may be an element that outputs the near infrared light. It is to be noted that the light source 10 may include a lens that converges the light emitted from the light emitting element 13 into a beam spot, in order to increase photon density. The control unit 50 may irradiate a plurality of places out of the photo-softening resin layer 200A with the light of the light emitting element 13. This causes formation of starting points at which stress causes the peeling off of the photo-softening resin layer 200A, at the plurality of places irradiated with the light of the light emitting element 13, out of the photo-softening resin layer 200A. As a result, after the irradiation of the photo-softening resin layer 200A with the light of the light emitting element 13, the user may allow the photo-softening resin layer 200A to peel off by the stress. Hence, in this case as well, it is possible to allow the shaped object 200 to easily peel off from the body subject to the stacking 100.

Modification Example F

FIG. 14 illustrates one modification example of the schematic configuration of the optical shaping apparatus 1. In the forgoing embodiment and its modification examples, the optical shaping apparatus 1 may include a heater unit 70. The heater unit 70 may cause a change in properties (softening or melting) of a thermo-softening resin layer 200B as illustrated in FIG. 15. The optical shaping apparatus 1 may propagate heat outputted from the heater unit 70 to the thermo-softening resin layer 200B. This causes the change in the properties (the softening or the melting) of the thermo-softening resin layer 200B. The change in the properties (the softening or the melting) of the thermo-softening resin layer 200B allows the shaped object 200 to easily peel off from the fingernail 111A.

As described above, in this modification example, the heater unit 70 for the peeling off of the shaped object 200 may be provided. Hence, it is possible to allow the shaped object 200 to easily peel off from the body subject to the stacking 100.

Modification Example G

The forgoing embodiment and its modification examples exemplify a case in which the body subject to the stacking 100 may be a tip of the human finger. However, the body subject to the stacking 100 may be other things than the tip of the human finger. The body subject to the stacking 100 may be, for example, a human arm or leg, a nail chip, or the electronic apparatus such as the smartphone.

Modification Example H

In the forgoing embodiment and its modification examples, the horizontal cross-section data Dthi or the imitative cross-section data Dtci may include color information in individual coordinate data. The color information may be, for example, information regarding three primary colors of a color material. In this case, for example, first, the optical shaping apparatus 1 may perform the light emission control of the light source unit 10, with a cyan-based photosensitive resin applied to the body subject to the stacking 100, in accordance with cyan-based color information included in the horizontal cross-section data Dthi or the imitative cross-section data Dtci. For example, next, the optical shaping apparatus 1 may perform the light emission control of the light source unit 10, with a magenta-based photosensitive resin applied to the body subject to the stacking 100, in accordance with magenta-based color information included in the horizontal cross-section data Dthi or the imitative cross-section data Dtci. For example, next, the optical shaping apparatus 1 may perform the light emission control of the light source unit 10, with a yellow-based photosensitive resin applied to the body subject to the stacking 100, in accordance with yellow-based color information included in the horizontal cross-section data Dthi or the imitative cross-section data Dtci. For example, the optical shaping apparatus 1 may further perform the light emission control of the light source unit 10, as necessary, with a white-based photosensitive resin applied to the body subject to the stacking 100, in accordance with white-based color information included in the horizontal cross-section data Dthi or the imitative cross-section data Dtci.

As described, in this modification example, the fabrication of the shaped object 200 based on the color information included in the horizontal cross-section data Dthi or the imitative cross-section data Dtci may be performed. Hence, it is possible to perform coloring of the shaped object 200.

Modification Example I

FIG. 16 illustrates one modification example of the cross-sectional configuration of the shaped object 200. In this modification example, the shaped object 200 includes an electronic device 200C and/or a light emitting element 200D in its inside. The electronic device 200C may be, for example, a wireless communication circuit. For example, let us assume that in the manufacturing process of the shaped object 200, the electronic device 200C and/or the light emitting element 200D are provided on the target surface St. In such a case, the optical shaping apparatus 1 may allow the sensor unit 30 to measure a surface shape of unevenness including the electronic device 200C and/or the light emitting element 200D. The optical shaping apparatus 1 may generate, on the basis of measurement data by the sensor unit 30, the position data Ds that corresponds to the surface shape of the unevenness including the electronic device 200C and/or the light emitting element 200D. In a case of the generation of the position data Ds in this way, the optical shaping apparatus 1 may make the correction of the coordinate data Dt on the basis of the position data Ds generated, and control the light emission of the light source unit 10 on the basis of the coordinate data Dt' after the correction.

As described, in this modification example, the correction of the coordinate data Dt may be made in consideration of the unevenness of the electronic device 200C and/or the light emitting element 200D, even in a case in which the electronic device 200C and/or the light emitting element 200D are provided on the target surface St in the manufacturing process of the shaped object 200. Hence, it is possible to reduce distortion of the shaped object 200 caused by presence of the electronic device 200C and/or the light emitting element 200D.

It is to be noted that a light receiving element or a motion sensor, or any other structure may be provided, instead of the light emitting element 200D. In a case in which the motion sensor is provided inside the shaped object 200, it is possible to provide, for example, a game with utilization of an output of the motion sensor. Moreover, a barcode that includes registration of personal information, or a GPS transmitter may be provided, instead of the electronic device 200C and the light emitting element 200D. In a case in which the barcode including the registration of the personal information is provided inside the shaped object 200, for example, it is possible to hold the barcode including the registration of the personal information over an external barcode reader, to perform personal identification. Moreover, in a case in which the GPS transmitter is provided inside the shaped object 200, it is possible to receive position information transmitted from the GPS transmitter with an external communication device, and thereby to track a person to whom the GPS transmitter is attached.

Modification Example J

The forgoing embodiment and its modification examples exemplify a case in which the photosensitive resin may be a resin that is hardened by, at least, the ultraviolet light. However, the photosensitive resin may be a negative resin that is hardened by light other than the ultraviolet radiation, or alternatively a positive resin that is softened by light.

Modification Example K

The forgoing embodiment and its modification examples provide the disclosure of the movable mirror 20 as one specific example of the optical path modulating element of the technology. However, any element that is able to displace an optical path of entering light may be applied instead of the movable mirror 20. Examples of the element that is able to displace the optical path of the entering light may include an optical path modulating element 21 as illustrated in FIG. 17. The optical path modulating element 21 may include a polygon refractor 21A, and a drive unit 21B that causes rotation drive of the polygon refractor 21A. The optical path modulating element 21 may allow, for example, the collimated light Lc1 entering at predetermined timing to be refracted by the polygon refractor 21A and pass through the polygon refractor 21A, with the polygon refractor 21A rotated and driven by the drive unit 21B. This allows light Lr5 passing through the polygon refractor 21A to perform the scan over the target surface St. As described, it is possible to precisely form the shaped object 200 not only on the flat surface but also on the curved surface, as with the forgoing embodiment, even in a case with the use of the optical path modulating element 21 instead of the movable mirror 20.

Modification Example L

In the forgoing embodiment and its modification examples, the shaped object 200 may be shaped as a thin sheet. In this case, the coordinate data Dt may be constituted by a plurality of pieces of three-dimensional coordinate data in which information on the heightwise direction is equal to one another, or alternatively the coordinate data Dt may be constituted by a plurality of pieces of two-dimensional coordinate data devoid of the information on the heightwise direction. Whichever configuration the coordinate data Dt has, the control unit 50 may make, for example, the correction of the coordinate data Dti, on the basis of the position data Ds, to the imitative coordinate data that follows the surface shape of the target surface St. Furthermore, the control unit 50 may control the light emission of the light source unit 10, on the basis of, for example, the imitative coordinate data obtained by the correction.

Modification Example M

In the forgoing embodiment and its modification examples, the optical shaping apparatus 1 may include a digital mirror device 22, for example, as illustrated in FIG. 18, instead of the movable mirror 20. FIG. 18 illustrates one example of a schematic configuration of the digital mirror device 22.

The digital mirror device 22 may be so constituted that the digital mirror device 22 includes a plurality of movable mirrors 22A that are two-dimensionally disposed. The plurality of movable mirrors 22A correspond to one specific example of a "plurality of reflectors" of the technology. Each of the movable mirrors 22A may be disposed on the optical path of the collimated light Lc1 outputted from the light source unit 10, and reflect the entering collimated light Lc1. The digital mirror device 22 may modulate (displace) the optical path of the light entering each of the movable mirrors 22A. In one specific example, the digital mirror device 22 may reflect the collimated light Lc1 entering each of the movable mirrors 22A. The digital mirror device 22 may allow each of the movable mirrors 22A displaced on the basis of the drive signal from the drive unit 40 or the drive unit 40A to reflect the collimated light Lc1 outputted from the light source unit 10. The digital mirror device 22 may thereby displace intensity distribution of the collimated light Lc1 (the reflected light Lr1) in the target surface St.

The drive unit 40 or the drive unit 40A may drive the digital mirror device 22, on a basis of a control signal from the control unit 50 or the control unit 50A. The control unit 50 or the control unit 50A may control the digital mirror device 22 through the drive unit 40 or the drive unit 40A. The control unit 50 or the control unit 50A may control operation of each of the movable mirrors 22A, on the basis of the position data Ds and the coordinate data Dt. The control unit 50 or the control unit 50A may control the operation of each of the movable mirrors 22A, on the basis of the position data Ds acquired before the light emission unit 10 performs the light emission, and the coordinate data Dt. In one specific example, the control unit 50 may make the correction of the coordinate data Dt, on the basis of the position data Ds acquired before the light emission unit 10 performs the light emission, and control the operation of each of the movable mirrors 22A, on the basis of the coordinate data Dt' thus obtained. The control unit 50 or the control unit 50A may displace each of the movable mirrors 22A, on the basis of the coordinate data Dt' obtained by the correction as described above (inclusive of the correction described in the modification example L as well). The control unit 50 or the control unit 50A may allow each of the movable mirrors 22A to modulate (displace) the optical path. The control unit 50 or the control unit 50A may thereby displace the intensity distribution of the collimated light Lc1 (the reflected light Lr1) in the target surface St.

In this modification example, the control unit 50 or the control unit 50A may control, or alternatively may not control, the light emission of the light source unit 10, on the basis of the coordinate data Dt, through the drive unit 40 or the drive unit 40A.

[Operation]

Description is given next of one example of the fabrication procedure of the shaped object 200 with the utilization of the optical shaping apparatus 1 according to this modification example. It is to be noted that in this modification example, a procedure after the acquisition of the coordinate data Dt' may be different from the procedures in the forgoing embodiment and its modification examples. Accordingly, in what follows, description is given of the procedure after the acquisition of the coordinate data Dt'.

The optical shaping apparatus 1 may control the operation of the digital mirror device 22, on the basis of the coordinate data Dt', to irradiate the target surface St with the collimated light Lc1 (the reflected light Lr1). The optical shaping apparatus 1 may allow each of the movable mirrors 22A to reflect the collimated light Lc1, on the basis of one piece of the horizontal cross-section data Dthi or one piece of the imitative cross-section data Dtci. In this way, the optical shaping apparatus 1 may irradiate the surface (the target surface St) of the photosensitive resin 210A applied to the body subject to the stacking 100, with the collimated light Lc1 (light reflected by each of the movable mirrors 22A (the reflected light Lr1)), and thereby form the resin hardened layer 210B (FIG. 8B).

Upon the end of the light irradiation by the digital mirror device 22, the optical shaping apparatus 1 may notify the user of the end of the process of the photosensitive resin 210A. The user may confirm the notification, and thereafter wipe off the non-hardened photosensitive resin 210A with the alcohols (e.g., ethanol).

In the case in which the fabrication of the shaped object 200 has not ended yet, the user may apply the photosensitive resin 210C in which the colored pigment or the dye is contained, to the resin hardened layer 210B (FIG. 8C). In the case in which the optical shaping apparatus 1 includes the mechanism that applies the photosensitive resin 210C to the surface including the resin hardened layer 210B, the optical shaping apparatus 1 may apply the photosensitive resin 210C to, for example, the surface including the resin hardened layer 210B, in accordance with the request for the application of the photosensitive resin 210C from the user.

Next, the user may have the thumb 111 inserted again in the predetermined place of the optical shaping apparatus 1, and thereafter request the optical shaping apparatus 1 to perform the process of the photosensitive resin 210C. Upon the input of the instruction of the process of the photosensitive resin 210C from the user, the optical shaping apparatus 1 may execute again the procedure as described above. For example, the optical shaping apparatus 1 may allow each of the movable mirrors 22A to reflect the collimated light Lc1, on the basis of a different piece of the horizontal cross-section data Dthi from that of the preceding process or a different piece of the imitative cross-section data Dtci from that of the preceding process. Thus, the optical shaping apparatus 1 may irradiate the surface (the target surface St) of the photosensitive resin 210C with the collimated light Lc1 (the light reflected by each of the movable mirrors 22A (the reflected light Lr1)), and thereby form the resin hardened layer 210D (FIG. 8D).

The optical shaping apparatus 1 may execute again step S102 as described above and step S103 as described above, after the application of the photosensitive resin 210C. However, in this case, the optical shaping apparatus 1 may determine again whether or not the position data Ds acquired before the light emission unit 10 performs the light emission (hereinbelow referred to as the "update data") is consistent with the horizontal cross-section data Dthi or the imitative cross-section data Dtci that is to be used in the control of the digital mirror device 22 (hereinbelow referred to as the "target data to be used"). The method of the determination may be similar to the method as described in the forgoing embodiment.

[Effects]

Description is given next of effects of the method of the manufacture with the optical shaping apparatus 1 according to this modification example. This modification example involves utilizing the collimated light as the light with which the target surface St is irradiated, as with the forgoing embodiment. Hence, it is possible to precisely form the shaped object 200 not only on the flat surface but also on the curved surface.

Modification Example N

In the forgoing embodiment and its modification examples, the optical shaping apparatus 1 may include, for example, a light transmission liquid crystal panel 23 as illustrated in FIG. 19, instead of the movable mirror 20. The liquid crystal panel 23 corresponds to one specific example of a "transmission liquid crystal panel" of the technology. The liquid crystal panel 23 may be constituted by, for example, HTPS (high temperature poly-silicon TFT liquid crystal). The liquid crystal panel 23 may include a plurality of light transmission liquid crystal cells that are two-dimensionally disposed.

The liquid crystal panel 23 may be disposed on the optical path of the collimated light Lc1 outputted from the light source unit 10, and perform spatial optical phase modulation of the entering collimated light Lc1. In one specific example, the liquid crystal panel 23 may modulate a phase of the collimated light Lc1 in each of the liquid crystal cells, to control transmission and blocking of the collimated light Lc1 for each of the liquid crystal cells. The liquid crystal panel 23 may displace a state of each of the liquid crystal cells, on the basis of a drive signal from the drive unit 40 or the drive unit 40A, and thereby displace the intensity distribution of the collimated light Lc1 (light passing through the liquid crystal panel 23, i.e., modulated light Lr6) in the target surface St.

The drive unit 40 or the drive unit 40A may drive the liquid crystal panel 23, on the basis of a control signal from the control unit 50 or the control unit 50A. The control unit 50 or the control unit 50A may control the liquid crystal panel 23 through the drive unit 40 or the drive unit 40A. The control unit 50 or the control unit 50A may control the liquid crystal panel 23, on the basis of the position data Ds and the coordinate data Dt. The control unit 50 or the control unit 50A may control operation of the liquid crystal panel 23, on the basis of the position data Ds acquired before the light emission unit 10 performs the light emission, and the coordinate data Dt. In one specific example, the control unit 50 may make the correction of the coordinate data Dt, on the basis of the position data Ds acquired before the light emission unit 10 performs the light emission, and control the operation of the liquid crystal panel 23, on the basis of the coordinate data Dt' thus obtained. In one specific example, the control unit 50 or the control unit 50A may displace the state of each of the liquid crystal cells, on the basis of the coordinate data Dt' obtained by the correction as described above (inclusive of the correction as described in the modification example L as well), and allow each of the liquid crystal cells to modulate the special optical phase of the collimated light Lc1. The control unit 50 or the control unit 50A may thereby displace the intensity distribution of the collimated light Lc1 (the modulated light Lr6) in the target surface St.

In this modification example, the control unit 50 or the control unit 50A may control, or alternatively may not control, the light emission of the light source unit 10, on the basis of the coordinate data Dt, through the drive unit 40 or the drive unit 40A.

[Operation]

Description is given next of one example of the fabrication procedure of the shaped object 200 with the utilization of the optical shaping apparatus 1 according to this modification example. It is to be noted that in this modification example, the procedure after the acquisition of the coordinate data Dt' may be different from the procedures in the forgoing embodiment and its modification examples. Accordingly, in what follows, description is given of the procedure after the acquisition of the coordinate data Dt'.

The optical shaping apparatus 1 may control the operation of the liquid crystal panel 23, on the basis of the coordinate data Dt', to irradiate the target surface St with the collimated light Lc1 (the modulated light Lr6). The optical shaping apparatus 1 may allow each of the liquid crystal cells to perform the spatial optical phase modulation with respect to the collimated light Lc1, on the basis of one piece of the horizontal cross-section data Dthi or one piece of the imitative cross-section data Dtci. In this way, the optical shaping apparatus 1 may irradiate the surface (the target surface St) of the photosensitive resin 210A applied to the body subject to the stacking 100, with the collimated light Lc1 (the modulated light Lr6), and thereby form the resin hardened layer 210B (FIG. 8B).

Upon the end of the light irradiation by the liquid crystal panel 23, the optical shaping apparatus 1 may notify the user of the end of the process of the photosensitive resin 210A. The user may confirm the notification, and thereafter wipe off the non-hardened photosensitive resin 210A with the alcohols (e.g., ethanol).

In the case in which the fabrication of the shaped object 200 has not ended yet, the user may apply the photosensitive resin 210C in which the colored pigment or the dye is contained, to the resin hardened layer 210B (FIG. 8C). In the case in which the optical shaping apparatus 1 includes the mechanism that applies the photosensitive resin 210C to the surface including the resin hardened layer 210B, the optical shaping apparatus 1 may apply the photosensitive resin 210C to, for example, the surface including the resin hardened layer 210B, in accordance with the request for the application of the photosensitive resin 210C from the user.

Next, the user may have the thumb 111 inserted again in the predetermined place of the optical shaping apparatus 1, and thereafter request the optical shaping apparatus 1 to perform the process of the photosensitive resin 210C. Upon the input of the instruction of the process of the photosensitive resin 210C from the user, the optical shaping apparatus 1 may execute again the procedure as described above. For example, the optical shaping apparatus 1 may allow each of the liquid crystal cells to perform the spatial optical phase modulation with respect to the collimated light Lc1, on the basis of a different piece of the horizontal cross-section data Dthi from that of the preceding process or a different piece of the imitative cross-section data Dtci from that of the preceding process. Thus, the optical shaping apparatus 1 may irradiate the surface (the target surface St) of the photosensitive resin 210C with the collimated light Lc1 (the modulated light Lr6), and thereby form the resin hardened layer 210D (FIG. 8D).

The optical shaping apparatus 1 may execute again step S102 as described above and step S103 as described above, after the application of the photosensitive resin 210C. However, in this case, the optical shaping apparatus 1 may determine again whether or not the position data Ds acquired before the light emission unit 10 performs the light emission (hereinbelow referred to as the "update data") is consistent with the horizontal cross-section data Dthi or the imitative cross-section data Dtci that is to be used in the control of the liquid crystal panel 23 (hereinbelow referred to as the "target data to be used"). The method of the determination may be similar to the method as described in the forgoing embodiment.

[Effects]

Description is given next of effects of the method of the manufacture with the optical shaping apparatus 1 according to this modification example. This modification example involves utilizing the collimated light as the light with which the target surface St is irradiated, as with the forgoing embodiment. Hence, it is possible to precisely form the shaped object 200 not only on the flat surface but also on the curved surface.

Modification Example O

In the forgoing embodiment and its modification examples, the optical shaping apparatus 1 may include, for example, a light reflection liquid crystal panel 24 as illustrated in FIG. 20, instead of the movable mirror 20. The liquid crystal panel 24 corresponds to one specific example of a "reflection liquid crystal panel" of the technology. The liquid crystal panel 24 may be constituted by, for example, LCOS (Liquid Crystal On Silicon). The liquid crystal panel 24 may include a plurality of light reflection liquid crystal cells that are two-dimensionally disposed.

The liquid crystal panel 24 may be disposed on the optical path of the collimated light Lc1 outputted from the light source unit 10, and perform the spatial optical phase modulation of the entering collimated light Lc1. In one specific example, the liquid crystal panel 24 may modulate the phase of the collimated light Lc1 in each of the liquid crystal cells, to control reflection and the blocking of the collimated light Lc1 for each of the liquid crystal cells. The liquid crystal panel 24 may displace the state of each of the liquid crystal cells, on the basis of the drive signal from the drive unit 40 or the drive unit 40A, and thereby displace the intensity distribution of the collimated light Lc1 (light reflected by the liquid crystal panel 24, i.e., modulated light Lr7) in the target surface St.

The drive unit 40 or the drive unit 40A may drive the liquid crystal panel 24, on the basis of the control signal from the control unit 50 or the control unit 50A. The control unit 50 or the control unit 50A may control the liquid crystal panel 24 through the drive unit 40 or the drive unit 40A. The control unit 50 or the control unit 50A may control the liquid crystal panel 24, on the basis of the position data Ds and the coordinate data Dt. The control unit 50 or the control unit 50A may control operation of the liquid crystal panel 24, on the basis of the position data Ds acquired before the light emission unit 10 performs the light emission, and the coordinate data Dt. In one specific example, the control unit 50 may make the correction of the coordinate data Dt, on the basis of the position data Ds acquired before the light emission unit 10 performs the light emission, and control the operation of the liquid crystal panel 24, on the basis of the coordinate data Dt' thus obtained. In one specific example, the control unit 50 or the control unit 50A may displace the state of each of the liquid crystal cells, on the basis of the coordinate data Dt' obtained by the correction as described above (inclusive of the correction as described in the modification example L as well), and allow each of the liquid crystal cells to modulate the special optical phase of the collimated light Lc1. The control unit 50 or the control unit 50A may thereby displace the intensity distribution of the collimated light Lc1 (the modulated light Lr7) in the target surface St.

In this modification example, the control unit 50 or the control unit 50A may control, or alternatively may not control, the light emission of the light source unit 10, on the basis of the coordinate data Dt, through the drive unit 40 or the drive unit 40A.

[Operation]

Description is given next of one example of the fabrication procedure of the shaped object 200 with the utilization of the optical shaping apparatus 1 according to this modification example. It is to be noted that in this modification example, the procedure after the acquisition of the coordinate data Dt' may be different from the procedures in the forgoing embodiment and its modification examples. Accordingly, in what follows, description is given of the procedure after the acquisition of the coordinate data Dt'.

The optical shaping apparatus 1 may control the operation of the liquid crystal panel 24, on the basis of the coordinate data Dt', to irradiate the target surface St with the collimated light Lc1 (the modulated light Lr7). The optical shaping apparatus 1 may allow each of the liquid crystal cells to perform the spatial optical phase modulation with respect to the collimated light Lc1, on the basis of one piece of the horizontal cross-section data Dthi or one piece of the imitative cross-section data Dtci. In this way, the optical shaping apparatus 1 may irradiate the surface (the target surface St) of the photosensitive resin 210A applied to the body subject to the stacking 100, with the collimated light Lc1 (the modulated light Lr7), and thereby form the resin hardened layer 210B (FIG. 8B).

Upon the end of the light irradiation by the liquid crystal panel 24, the optical shaping apparatus 1 may notify the user of the end of the process of the photosensitive resin 210A. The user may confirm the notification, and thereafter wipe off the non-hardened photosensitive resin 210A with the alcohols (e.g., ethanol).

In the case in which the fabrication of the shaped object 200 has not ended yet, the user may apply the photosensitive resin 210C in which the colored pigment or the dye is contained, to the resin hardened layer 210B (FIG. 8C). In the case in which the optical shaping apparatus 1 includes the mechanism that applies the photosensitive resin 210C to the surface including the resin hardened layer 210B, the optical shaping apparatus 1 may apply the photosensitive resin 210C to, for example, the surface including the resin hardened layer 210B, in accordance with the request for the application of the photosensitive resin 210C from the user.

Next, the user may have the thumb 111 inserted again in the predetermined place of the optical shaping apparatus 1, and thereafter request the optical shaping apparatus 1 to perform the process of the photosensitive resin 210C. Upon the input of the instruction of the process of the photosensitive resin 210C from the user, the optical shaping apparatus 1 may execute again the procedure as described above. For example, the optical shaping apparatus 1 may allow each of the liquid crystal cells to perform the spatial optical phase modulation with respect to the collimated light Lc1, on the basis of a different piece of the horizontal cross-section data Dthi from that of the preceding process or a different piece of the imitative cross-section data Dtci from that of the preceding process. Thus, the optical shaping apparatus 1 may irradiate the surface (the target surface St) of the photosensitive resin 210C with the collimated light Lc1 (the modulated light Lr7), and thereby form the resin hardened layer 210D (FIG. 8D).

The optical shaping apparatus 1 may execute again step S102 as described above and step S103 as described above, after the application of the photosensitive resin 210C. However, in this case, the optical shaping apparatus 1 may determine again whether or not the position data Ds acquired before the light emission unit 10 performs the light emission (hereinbelow referred to as the "update data") is consistent with the horizontal cross-section data Dthi or the imitative cross-section data Dtci that is to be used in the control of the liquid crystal panel 24 (hereinbelow referred to as the "target data to be used"). The method of the determination may be similar to the method as described in the forgoing embodiment.

[Effects]

Description is given next of effects of the method of the manufacture with the optical shaping apparatus 1 according to this modification example. This modification example involves utilizing the collimated light as the light with which the target surface St is irradiated, as with the forgoing embodiment. Hence, it is possible to precisely form the shaped object 200 not only on the flat surface but also on the curved surface.

Although description has been made by giving the embodiment and its modification examples as mentioned above, the contents of the technology are not limited to the above-mentioned example embodiments and may be modified in a variety of ways. It is to be noted that effects described herein are merely exemplified. Effects of the technology are not limited to the effects described herein. Effects of the technology may further include other effects than the effects described herein.

Moreover, for example, the technology may have the following configuration.

(1) An optical shaping apparatus, including:
  a light source unit that outputs collimated light;
  an optical function unit that is disposed on an optical path of the collimated light and modulates the optical path or a phase of the collimated light; and
  a control unit that controls operation of the optical function unit, to irradiate a target surface with modulated light produced in the optical function unit.

(2) The optical shaping apparatus according to (1), in which
  the optical function unit includes an optical path modulating element that modulates the optical path of the collimated light, and
  the control unit controls operation of the optical path modulating element, to allow the modulated light to perform a scan over the target surface, and controls light emission of the light source unit on a basis of coordinate data of a shaped object.

(3) The optical shaping apparatus according to (1), in which
  the optical function unit includes a plurality of reflectors that are two-dimensionally disposed and reflects the collimated light, and
  the control unit controls operation of each of the reflectors on a basis of coordinate data of a shaped object, to irradiate the target surface with the modulated light.

(4) The optical shaping apparatus according to (1), in which
  the optical function unit performs spatial optical phase modulation of the collimated light, and
  the control unit controls, on a basis of coordinate data of a shaped object, the spatial optical phase modulation in the optical function unit, to irradiate the target surface with the modulated light.

(5) The optical shaping apparatus according to any one of (1) to (4), in which the light source unit includes:
  a light emitting element that outputs ultraviolet light; and
  a collimator disposed on an optical path of the ultraviolet light.

(6) The optical shaping apparatus according to (5), further including a sensor unit that acquires position data of the target surface, in which the control unit controls light emission of the light source unit or the operation of the optical function unit, or both, on a basis of the position data and coordinate data of a shaped object.

(7) The optical shaping apparatus according to (6), in which the control unit controls the light emission of the light source unit or the operation of the optical function unit, or both, on the basis of the position data and the coordinate data, the position data having been acquired before the light source unit performs the light emission.

(8) The optical shaping apparatus according to (7), in which the control unit controls the light emission of the light source unit or the operation of the optical function unit, or both, on the basis of the position data and the coordinate data, the position data being acquired in a middle of the light emission of the light source unit.

(9) The optical shaping apparatus according to (7), in which the control unit makes correction of the coordinate data on a basis of the position data, and controls the light emission of the light the operation or the operation of the optical function unit, or both, on a basis of the coordinate data after the correction.

(10) The optical shaping apparatus according to (9), in which the coordinate data is constituted by a plurality of pieces of horizontal cross-section data, and the control unit makes the correction of the coordinate data, on the basis of the position data, to a plurality of pieces of imitative cross-section data that follow a surface shape of the target surface, and controls the light emission of the light source unit or the operation of the light source unit, or both, on a basis of the plurality of pieces of the imitative cross-section data obtained by the correction.

(11) The optical shaping apparatus according to (9), in which the coordinate data is constituted by a plurality of pieces of horizontal cross-section data, and the control unit makes correction of the horizontal cross-section data, on the basis of the position data, to imitative cross-section data that follows a surface shape of the target surface, and controls the light emission of the light source unit or the operation of the light source unit, or both, on a basis of a plurality of pieces of the imitative cross-section data obtained by the correction.

(12) The optical shaping apparatus according to (9), in which the coordinate data is constituted by a plurality of pieces of three-dimensional coordinate data in which information on a heightwise direction is equal to one another, or the coordinate data is constituted by a plurality of pieces of two-dimensional coordinate data devoid of the information on the heightwise direction, and the control unit makes the correction of the coordinate data, on the basis of the position data, to imitative coordinate data that follows a surface shape of the target surface, and controls the light emission of the light source unit or the operation of the light source unit, or both, on a basis of the imitative coordinate data obtained by the correction.

(13) The optical shaping apparatus according to (9), in which the control unit makes, on the basis of the position data, correction that includes omission of part of the coordinate data, or correction that includes addition of dummy data to the coordinate data, and controls the light emission of the light source unit or the operation of the light source unit, or both, on a basis of corrected coordinate data obtained by the correction.

(14) The optical shaping apparatus according to (2), in which the optical path modulating element includes a MEMS mirror, a polygon mirror, a polygon refractor, or a galvanometer mirror.

(15) The optical shaping apparatus according to (3), in which the optical function unit includes a digital mirror device including the plurality of reflectors.

(16) The optical shaping apparatus according to (4), in which the optical function unit includes a reflection or transmission liquid crystal panel.

(17) The optical shaping apparatus according to (6), further including:

an electronic apparatus including the sensor unit, the control unit, and a first casing that provides protection for the sensor unit and the control unit; and a second casing that provides protection for the light source unit and the optical function unit, the first casing and the second casing being constituted by separate bodies from each other.

(18) A method of manufacturing a shaped object, including:

a first step that includes modulating an optical path or a phase of collimated light outputted from a light source unit, to produce modulated light of the collimated light, while irradiating a surface of a photosensitive resin applied to a body subject to stacking, with the modulated light produced, to form a first resin hardened layer; and a second step that includes modulating the optical path or the phase of the collimated light outputted from the light source unit, to produce the modulated light of the collimated light, while irradiating a surface of a photosensitive resin newly applied to the first resin hardened layer formed by the first step, to form a second resin hardened layer.

(19) The method of manufacturing the shaped object according to (18), in which the first step includes controlling light emission of the light source unit on a basis of one piece of horizontal cross-section data in coordinate data of the shaped object, the coordinate data being constituted by a plurality of pieces of the horizontal cross-section data, while allowing an optical path modulating element to displace the optical path of the collimated light outputted from the light source unit, to allow the modulated light to scan the surface of the photosensitive resin applied to the body subject to the stacking, to form the first resin hardened layer, and the second step includes controlling the light emission of the light source unit on a basis of another piece of the horizontal cross-section data in the coordinate data, while allowing the optical path modulating element to displace the optical path of the collimated light outputted from the light source unit, to allow the modulated light to scan the surface of the photosensitive resin newly applied to the first resin hardened layer, to form the second resin hardened layer.

(20) The method of manufacturing the shaped object according to (18), in which the first step includes controlling operation of a plurality of reflectors that are two-dimensionally disposed, on a basis of one piece of horizontal cross-section data in coordinate data of the shaped object, the coordinate data being constituted by a plurality of pieces of the horizontal cross-section data, while allowing each of the reflectors to reflect the collimated light outputted from the light source unit, to irradiate the surface of the photosensitive resin applied to the body subject to the stacking, with the modulated light produced in the plurality of reflectors, to form the first resin hardened layer, and the second step includes controlling the plurality of reflectors on a basis of another piece of the horizontal cross-section data in the coordinate data, while allowing each of the reflectors to reflect the collimated light outputted from the light source unit, to irradiate the surface of the photosensitive resin newly applied to the first resin hardened layer, with the modulated light produced in the plurality of reflectors, to form the second resin hardened layer.

(21) The method of manufacturing the shaped object according to (18), in which the first step includes performing spatial optical phase modulation of the collimated light outputted from the light source unit, on a basis of one piece of horizontal cross-section data in coordinate data of the shaped object, the coordinate data being constituted by a plurality of pieces of the horizontal cross-section data, while irradiating the surface of the photosensitive resin applied to the body subject to the stacking, with the modulated light produced by the spatial optical phase modulation, to form the first resin hardened layer, and the second step includes performing the spatial optical phase modulation of the collimated light outputted from the light source unit, on a basis of another piece of the horizontal cross-section data in the coordinate data, to irradiate the surface of the photosensitive resin newly applied to the first resin hardened layer, with the modulated light produced by the spatial optical phase modulation, to form the second resin hardened layer.

This application claims the benefit of Japanese Priority Patent Application JP2014-13380 filed on Oct. 20, 2014, the entire contents of which are incorporated herein by reference.

It should be understood by those skilled in the art that various modifications, combinations, sub-combinations and alterations may occur depending on design requirements and other factors insofar as they are within the scope of the appended claims or the equivalents thereof.

The invention claimed is:

1. An optical shaping apparatus, comprising:
a light source unit that outputs collimated light;
an optical function unit that is disposed on an optical path of the collimated light and modulates the optical path or a phase of the collimated light; and
a control unit that controls operation of the optical function unit, to irradiate a target surface with modulated light produced in the optical function unit, wherein the optical function unit is configured to scan the target surface with the collimated light and wherein the control unit is configured to control light emission of the light source unit on a basis of coordinate data of a shaped object.

2. The optical shaping apparatus according to claim 1, wherein
the optical function unit includes an optical path modulating element that modulates the optical path of the collimated light, and
the control unit controls operation of the optical path modulating element, to allow the modulated light to perform a scan over the target surface.

3. The optical shaping apparatus according to claim 1, wherein
the optical function unit includes a plurality of reflectors that are two-dimensionally disposed and reflects the collimated light, and
the control unit controls operation of each of the plurality of reflectors on a basis of coordinate data of a shaped object, to irradiate the target surface with the modulated light.

4. The optical shaping apparatus according to claim 1, wherein
the optical function unit performs spatial optical phase modulation of the collimated light, and
the control unit controls, on a basis of coordinate data of a shaped object, the spatial optical phase modulation in the optical function unit, to irradiate the target surface with the modulated light.

5. The optical shaping apparatus according to claim 1, wherein
the light source unit includes:
a light emitting element that outputs ultraviolet light; and
a collimator disposed on an optical path of the ultraviolet light.

6. The optical shaping apparatus according to claim 5, further comprising a sensor unit that acquires position data of the target surface, wherein
the control unit controls light emission of the light source unit or the operation of the optical function unit, or both, on a basis of the position data and coordinate data of a shaped object.

7. The optical shaping apparatus according to claim 6, wherein
the control unit controls the light emission of the light source unit or the operation of the optical function unit, or both, on the basis of the position data and the coordinate data, the position data having been acquired before the light source unit performs the light emission.

8. The optical shaping apparatus according to claim 7, wherein
the control unit controls the light emission of the light source unit or the operation of the optical function unit, or both, on the basis of the position data and the coordinate data, the position data being acquired in a middle of the light emission of the light source unit.

9. The optical shaping apparatus according to claim 7, wherein
the control unit makes correction of the coordinate data on a basis of the position data, and controls the light emission of the light source unit or the operation of the optical function unit, or both, on a basis of the coordinate data after the correction.

10. The optical shaping apparatus according to claim 9, wherein
the coordinate data is constituted by a plurality of pieces of horizontal cross-section data, and
the control unit makes the correction of the coordinate data, on the basis of the position data, to a plurality of pieces of imitative cross-section data that follow a surface shape of the target surface, and controls the light emission of the light source unit or the operation of the light source unit, or both, on a basis of the plurality of pieces of the imitative cross-section data obtained by the correction.

11. The optical shaping apparatus according to claim 9, wherein
the coordinate data is constituted by a plurality of pieces of horizontal cross-section data, and
the control unit makes correction of the horizontal cross-section data, on the basis of the position data, to imitative cross-section data that follows a surface shape of the target surface, and controls the light emission of the light source unit or the operation of the light source unit, or both, on a basis of a plurality of pieces of the imitative cross-section data obtained by the correction.

12. The optical shaping apparatus according to claim 9, wherein the coordinate data is constituted by a plurality of pieces of three-dimensional coordinate data in which information on a heightwise direction is equal to one another, or the coordinate data is constituted by a plurality of pieces of two-dimensional coordinate data devoid of the information on the heightwise direction, and the control unit makes the correction of the coordinate data, on the basis of the position data, to imitative coordinate data that follows a surface shape of the target surface, and controls the light emission of the light source unit or the operation of the light source unit, or both, on a basis of the imitative coordinate data obtained by the correction.

13. The optical shaping apparatus according to claim 9, wherein the control unit makes, on the basis of the position data, correction that includes omission of part of the coordinate data, or correction that includes addition of dummy data to the coordinate data, and controls the light emission of the light source unit or the operation of the light source unit, or both, on a basis of corrected coordinate data obtained by the correction.

14. The optical shaping apparatus according to claim 2, wherein the optical path modulating element includes a MEMS mirror, a polygon mirror, a polygon refractor, or a galvanometer mirror.

15. The optical shaping apparatus according to claim 3, wherein the optical function unit includes a digital mirror device including the plurality of reflectors.

16. The optical shaping apparatus according to claim 4, wherein the optical function unit includes a reflection or transmission liquid crystal panel.

17. The optical shaping apparatus according to claim 6, further comprising:

an electronic apparatus including the sensor unit, the control unit, and a first casing that provides protection for the sensor unit and the control unit; and a second casing that provides protection for the light source unit and the optical function unit, the first casing and the second casing being constituted by separate bodies from each other.

* * * * *